United States Patent
Nam et al.

(10) Patent No.: US 11,638,244 B2
(45) Date of Patent: *Apr. 25, 2023

(54) TRANSMISSION OF BEAM SWITCH COMMANDS THROUGH CONTROL CHANNEL SIGNALING

(71) Applicant: QUALCOMM Incorporated, San Diego, CA (US)

(72) Inventors: Wooseok Nam, San Diego, CA (US); Tao Luo, San Diego, CA (US); Sony Akkarakaran, Poway, CA (US); Makesh Pravin John Wilson, San Diego, CA (US); Sumeeth Nagaraja, Los Altos, CA (US); Xiao Feng Wang, San Diego, CA (US); Shengbo Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/130,547

(22) Filed: Dec. 22, 2020

(65) Prior Publication Data

US 2021/0112530 A1 Apr. 15, 2021

Related U.S. Application Data

(63) Continuation of application No. 16/419,622, filed on May 22, 2019, now Pat. No. 10,893,516, which is a (Continued)

(51) Int. Cl.
*H04W 72/04* (2009.01)
*H04W 72/044* (2023.01)
(Continued)

(52) U.S. Cl.
CPC ........ *H04W 72/042* (2013.01); *H04B 7/0617* (2013.01); *H04B 7/0619* (2013.01);
(Continued)

(58) Field of Classification Search
CPC . H04W 72/042; H04W 72/046; H04W 16/28; H04W 76/10; H04W 76/27; H04W 48/12; H04L 1/0047
See application file for complete search history.

(56) References Cited

U.S. PATENT DOCUMENTS 8,654,705 B2 2/2014 Wang et al.
9,184,806 B2 11/2015 Kim et al.
(Continued)

FOREIGN PATENT DOCUMENTS

JP 2014112944 A 6/2014
KR 20130079995 A 7/2013
(Continued)

OTHER PUBLICATIONS

International Preliminary Report on Patentability—PCT/US2018/050909, The International Bureau of WIPO—Geneva, Switzerland, dated Apr. 2, 2020.
(Continued)

*Primary Examiner* — Warner Wong
(74) *Attorney, Agent, or Firm* — Nerrie M. Zohn

(57) ABSTRACT

Methods, systems, and devices for wireless communications provide for transmission of a beam switch command to a user equipment (UE) via control channel signaling. The UE may establish a connection with a base station using a first transmission beam, receive configuration information configuring the UE to select between a first decoding hypothesis corresponding to downlink control information (DCI) including a bit field including a beam switch command and a second decoding hypothesis corresponding to the DCI not
(Continued)

including the bit field, receive a downlink control channel transmission via the first transmission beam, decode the downlink control channel transmission in accordance with the configuration information to obtain decoded DCI, and communicate with the base station based at least in part on the decoded DCI.

16 Claims, 22 Drawing Sheets

Related U.S. Application Data continuation of application No. 16/152,104, filed on Oct. 4, 2018, now Pat. No. 10,383,107, which is a continuation of application No. 15/950,118, filed on Apr. 10, 2018, now Pat. No. 10,123,322.

(60) Provisional application No. 62/560,168, filed on Sep. 18, 2017.

(51) Int. Cl.
| | | |
|---|---|---|
| *H04W 16/28* | (2009.01) | |
| *H04L 1/00* | (2006.01) | |
| *H04B 7/06* | (2006.01) | |
| *H04B 7/08* | (2006.01) | |
| *H04L 5/00* | (2006.01) | |
| *H04W 72/08* | (2009.01) | |
| *H04W 72/1273* | (2023.01) | |
| *H04W 72/12* | (2023.01) | |
| *H04W 76/10* | (2018.01) | |
| *H04W 88/02* | (2009.01) | |
| *H04W 76/27* | (2018.01) | |

(52) U.S. Cl.
CPC ........... *H04B 7/0695* (2013.01); *H04B 7/088* (2013.01); *H04L 1/0038* (2013.01); *H04L 5/0053* (2013.01); *H04L 5/0092* (2013.01); *H04L 5/0094* (2013.01); *H04L 5/0098* (2013.01); *H04W 16/28* (2013.01); *H04W 72/046* (2013.01); *H04W 72/08* (2013.01); *H04W 72/1273* (2013.01); *H04W 72/1278* (2013.01); *H04W 72/1294* (2013.01); *H04L 1/0047* (2013.01); *H04W 76/10* (2018.02); *H04W 76/27* (2018.02); *H04W 88/02* (2013.01)

(56) References Cited

U.S. PATENT DOCUMENTS

| | | | |
|---|---|---|---|
| 9,438,399 B2 | 9/2016 | Kim et al. | |
| 9,615,363 B2 | 4/2017 | Seo et al. | |
| 9,843,974 B1 | 12/2017 | Touboul et al. | |
| 10,003,446 B2 | 6/2018 | Yu et al. | |
| 10,123,322 B1 | 11/2018 | Nam et al. | |
| 10,383,107 B2 | 8/2019 | Nam et al. | |
| 10,560,851 B2 | 2/2020 | Guo et al. | |
| 10,708,902 B2 | 7/2020 | Nam et al. | |
| 2003/0016686 A1* | 1/2003 | Wynne .................. H04L 49/255 370/389 |
| 2007/0060061 A1 | 3/2007 | Sampath | |
| 2008/0235552 A1 | 9/2008 | Tsai et al. | |
| 2010/0120442 A1 | 5/2010 | Zhuang et al. | |
| 2010/0190447 A1 | 7/2010 | Agrawal et al. | |
| 2010/0279628 A1 | 11/2010 | Love et al. | |
| 2011/0019715 A1 | 1/2011 | Brisebois | |
| 2011/0085502 A1 | 4/2011 | Malladi | |
| 2011/0116428 A1 | 5/2011 | Seong et al. | |
| 2011/0269490 A1 | 11/2011 | Earnshaw et al. | |
| 2012/0320782 A1 | 12/2012 | Seo et al. | |
| 2013/0039284 A1 | 2/2013 | Marinier et al. | |
| 2013/0058285 A1 | 3/2013 | Koivisto et al. | |
| 2013/0077523 A1 | 3/2013 | Ko et al. | |
| 2013/0083666 A1 | 4/2013 | Gaal et al. | |
| 2013/0114525 A1 | 5/2013 | Ahmadi | |
| 2013/0121185 A1 | 5/2013 | Li et al. | |
| 2013/0201932 A1 | 8/2013 | Ko et al. | |
| 2013/0250880 A1 | 9/2013 | Liao et al. | |
| 2013/0283134 A1 | 10/2013 | Bai et al. | |
| 2014/0050159 A1 | 2/2014 | Frenne et al. | |
| 2014/0078919 A1 | 3/2014 | Hammarwall | |
| 2014/0307696 A1 | 10/2014 | Choi et al. | |
| 2014/0369242 A1 | 12/2014 | Ng et al. | |
| 2015/0009952 A1 | 1/2015 | Berggren et al. | |
| 2015/0085717 A1 | 3/2015 | Papasakellariou et al. | |
| 2015/0149874 A1 | 5/2015 | Cohen et al. | |
| 2016/0183234 A1* | 6/2016 | Sung ................... H04W 72/046 370/329 |
| 2016/0183244 A1 | 6/2016 | Papasakellariou | |
| 2016/0295561 A1 | 10/2016 | Papasakellariou | |
| 2016/0316465 A1 | 10/2016 | Sahlin et al. | |
| 2017/0006593 A1 | 1/2017 | Liu | |
| 2017/0047976 A1 | 2/2017 | Noh et al. | |
| 2017/0134080 A1 | 5/2017 | Rahman et al. | |
| 2017/0171845 A1 | 6/2017 | Seo et al. | |
| 2017/0257243 A1 | 9/2017 | Sahlin et al. | |
| 2017/0311296 A1 | 10/2017 | Onggosanusi et al. | |
| 2017/0311346 A1 | 10/2017 | Chendamarai Kannan et al. | |
| 2017/0317806 A1 | 11/2017 | Beale et al. | |
| 2017/0332359 A1 | 11/2017 | Tsai et al. | |
| 2017/0332386 A1 | 11/2017 | Li et al. | |
| 2017/0346534 A1* | 11/2017 | Islam ..................... H01Q 1/246 |
| 2017/0346535 A1* | 11/2017 | Islam ................... H04B 7/0617 |
| 2017/0346539 A1* | 11/2017 | Islam ................... H04B 7/0408 |
| 2017/0346543 A1* | 11/2017 | Islam ................... H04B 7/0417 |
| 2017/0346544 A1* | 11/2017 | Islam ................... H04W 16/28 |
| 2017/0346545 A1* | 11/2017 | Islam ................... H04B 7/0617 |
| 2017/0349065 A1* | 12/2017 | Pleiman .............. B60N 2/2851 |
| 2017/0353281 A1 | 12/2017 | Ahmadi | |
| 2017/0359089 A1 | 12/2017 | Lin et al. | |
| 2017/0359826 A1* | 12/2017 | Islam .................... H04W 72/14 |
| 2017/0366992 A1 | 12/2017 | Rune et al. | |
| 2018/0014278 A1 | 1/2018 | Papasakellariou et al. | |
| 2018/0048375 A1 | 2/2018 | Guo et al. | |
| 2018/0048378 A1 | 2/2018 | Kotecha et al. | |
| 2018/0145738 A1 | 5/2018 | Geirhofer et al. | |
| 2018/0184434 A1 | 6/2018 | Blankenship et al. | |
| 2018/0206244 A1 | 7/2018 | Yang et al. | |
| 2018/0227886 A1 | 8/2018 | Chou et al. | |
| 2018/0234959 A1* | 8/2018 | Ahn .................... H04W 72/046 |
| 2018/0235024 A1 | 8/2018 | Fan et al. | |
| 2018/0242231 A1 | 8/2018 | Reial et al. | |
| 2018/0270689 A1 | 9/2018 | Akkarakaran et al. | |
| 2018/0270717 A1 | 9/2018 | Kakishima et al. | |
| 2018/0309496 A1* | 10/2018 | Lee ..................... H04B 7/0628 |
| 2018/0317225 A1 | 11/2018 | Akkarakaran et al. | |
| 2018/0368142 A1 | 12/2018 | Liou | |
| 2018/0375556 A1 | 12/2018 | Wang et al. | |
| 2019/0028176 A1 | 1/2019 | Zhang et al. | |
| 2019/0052331 A1 | 2/2019 | Chang et al. | |
| 2019/0081688 A1 | 3/2019 | Deenoo et al. | |
| 2019/0082330 A1* | 3/2019 | Guey ................... H04L 5/0048 |
| 2019/0089446 A1 | 3/2019 | Zhang et al. | |
| 2019/0090223 A1 | 3/2019 | Nam et al. | |
| 2019/0124635 A1 | 4/2019 | Nam et al. | |
| 2019/0141559 A1 | 5/2019 | Tang et al. | |
| 2019/0141691 A1* | 5/2019 | Kwon ................... H04B 7/088 |
| 2019/0165843 A1* | 5/2019 | Shang .................. H04B 7/0695 |
| 2019/0199412 A1 | 6/2019 | Koskela et al. | |
| 2019/0260521 A1* | 8/2019 | Luo ................... H04W 72/1273 |
| 2019/0260532 A1* | 8/2019 | Manolakos ........... H04L 5/0094 |
| 2019/0261380 A1 | 8/2019 | Iyer et al. | |
| 2019/0274125 A1 | 9/2019 | Nam et al. | |
| 2019/0306847 A1 | 10/2019 | Seo et al. | |
| 2019/0313397 A1* | 10/2019 | Chen ................... H04W 72/0413 |
| 2019/0349065 A1* | 11/2019 | Zhang ............... H04W 72/1273 |
| 2020/0028545 A1* | 1/2020 | Koskela ............... H04B 7/0408 |
| 2020/0037327 A1 | 1/2020 | Luo | |
| 2020/0053673 A1 | 2/2020 | Reial et al. | |

(56) References Cited

U.S. PATENT DOCUMENTS

| | | | |
|---|---|---|---|
| 2020/0067675 A1 | 2/2020 | Takeda et al. | |
| 2020/0076492 A1 | 3/2020 | Wu et al. | |
| 2020/0099437 A1 | 3/2020 | Harada et al. | |
| 2020/0106513 A1 | 4/2020 | Islam et al. | |
| 2020/0128455 A1 | 4/2020 | Da Silva et al. | |
| 2020/0186297 A1 | 6/2020 | Astrom et al. | |
| 2020/0252951 A1 | 8/2020 | Frenne et al. | |
| 2020/0267733 A1* | 8/2020 | Islam | H04L 5/0048 |
| 2020/0305088 A1 | 9/2020 | Nory et al. | |
| 2020/0389224 A1* | 12/2020 | Islam | H04W 28/0231 |

FOREIGN PATENT DOCUMENTS

| | | | |
|---|---|---|---|
| KR | 20140129147 A | 11/2014 | |
| KR | 20170020187 A | 2/2017 | |
| TW | 201728207 A | 8/2017 | |
| WO | WO-2013121727 A1 | 8/2013 | |
| WO | 2015187130 A1 | 12/2015 | |
| WO | WO-2016069270 A1 | 5/2016 | |
| WO | WO-2016070417 A1 | 5/2016 | |
| WO | 2017022902 A1 | 2/2017 | |
| WO | 2017083489 A1 | 5/2017 | |
| WO | WO-2017083514 A1 | 5/2017 | |
| WO | 2017101876 A1 | 6/2017 | |
| WO | WO-2017135159 A1 | 8/2017 | |
| WO | WO-2017140374 A1 | 8/2017 | |
| WO | WO-2018013596 A1 | 1/2018 | |
| WO | WO-2018031953 A1 | 2/2018 | |
| WO | 2018083244 A1 | 5/2018 | |
| WO | 2018127335 A1 | 7/2018 | |
| WO | 2018129319 A1 | 7/2018 | |
| WO | WO-2018229727 A1 | 12/2018 | |
| WO | 2019032853 A1 | 2/2019 | |
| WO | WO2019/029700 * | 2/2019 | H04B 17/309 |
| WO | WO-2019032882 A1 | 2/2019 | |
| WO | WO-2019051242 A2 | 3/2019 | |

OTHER PUBLICATIONS

International Search Report and Written Opinion—PCT/US2018/050909—ISA/EPO—dated Jan. 16, 2019.

CATT: "Details of Beam Management", 3GPP Draft, 3GPP TSG RAN WG1 Meeting NR#3, R1-1715801_NRMIMO_Beam_Management_V3, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051339261, 10 Pages, Retrieved from the Internet: URL: http://www.3gpp.org/ftp/Meetings_3GPP_SYNC/RAN1/Docs/, [retrieved on Sep. 17, 2017], Section 2.1.1.

ERICSSON: "Beam Management in NR", 3GPP Draft, 3GPP TSG-RAN WG2 Meeting #98, Tdoc R2-1704102—Beam Management in NR, 3rd Generation Partnership Project (3GPP), Mobile Competence Centre, 650, Route Des Lucioles, F-06921 Sophia-Antipolis Cedex, France, vol. RAN WG2, No. Hangzhou, China, Apr. 15, 2017-Apr. 19, 2017 May 14, 2017 (May 14, 2017), XP051274710, pp. 1-5, Retrieved from the Internet: URL: http://www.3gpp.org/ftp/Meetings_3GPP_SYNC/RAN2/Docs/ [retrieved on May 14, 2017].

Taiwan Search Report—TW107132405—TIPO—dated Nov. 19, 2021.

Dahlman E., et al., "4G LTE/LTE-Advanced", vol. 1, Maruzen Publishing Co., Ltd., Oct. 20, 2015, 16 Pages.

Huawei, "DCI Contents and Formats in NR", 3GPP TSG RAN WG1 Meeting NR#3, R1-1715397, Nagoya, Japan, Sep. 18-21, 2017, Sep. 11, 2017, 9 Pages.

Guangdong Oppo Mobile Telecom, "Resource Allocation for PDSCH/PUSCH", 3GPP TSG RAN WG1 Meeting NR#3, 3GPP TSG RAN WG1 adhoc_NR_AH_1709, R1-1715690, Nagoya, Japan, Sep. 18-21, 2017, Sep. 11, 2017, 13 Pages.

* cited by examiner

TRANSMISSION OF BEAM SWITCH COMMANDS THROUGH CONTROL CHANNEL SIGNALING

CROSS REFERENCES

The present Application for Patent is a continuation of U.S. patent application Ser. No. 16/419,622 by Nam, et al., entitled, "Transmission of Beam Switch Commands Through Control Channel Signaling" filed May 22, 2019, which is a continuation of U.S. patent application Ser. No. 16/152,104 by Nam, et al., entitled, "Transmission of Beam Switch Commands Through Control Channel Signaling" filed Oct. 4, 2018, now U.S. Pat. No. 10,383,107 issued on Jul. 7, 2020, which is a continuation of U.S. patent application Ser. No. 15/950,118 by Nam, et al., entitled, "Transmission of Beam Switch Commands Through Control Channel Signaling" filed Apr. 10, 2018, now U.S. Pat. No. 10,123,322 issued on Nov. 6, 2018 which claims priority to U.S. Provisional Patent Application No. 62/560,168 by Nam, et al., entitled "Transmission of Beam Switch Commands Through Control Channel Signaling," filed Sep. 18, 2017, assigned to the assignee hereof.

BACKGROUND

The following relates generally to wireless communication, and more specifically to transmission of beam switch commands through control channel signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In a mmW system, a base station and a UE may communicate via one or more directional beams. A transmitter (e.g. a base station) may engage in a beam sweeping procedure to establish a set of active beam pairs with a receiver (e.g., a UE). An active beam pair may include an active transmit beam of the transmitter and a corresponding active receive beam of the receiver. The transmit beams and the receive beams in an active beam pair may be refined through, for example, beam refinement procedures. As the transmit beams are directional, when a UE moves relative to the base station, the transmit and receive beams may need to be switched to different beams of a different beam pair corresponding to a different direction. Efficient techniques for performing such beam switching may help to enhance the efficiency of mmW systems.

SUMMARY

The described techniques relate to improved methods, systems, devices, or apparatuses that support transmission of beam switch commands through control channel signaling. Generally, the techniques provide for configuring a user equipment (UE) to select between different decoding hypotheses for blind decoding of a control channel transmission based on whether downlink control information (DCI) includes a beam switch command.

In some examples, a physical downlink control channel (PDCCH) transmission may include DCI that may or might not have a field for a beam switch command. The UE may identify the beam switch command, if any, by blind decoding the PDCCH transmission according to one or more different decoding hypotheses, and perform a beam switch operation based on the beam switch command. In some examples, the UE may need to perform multiple blind decodings since the UE may not know whether the DCI within the PDCCH transmission includes the field for the beam switching command. The decoding hypothesis vary depending on a bit length of the DCI and whether the DCI includes the field for the beam switching command. Thus, the UE may perform multiple decoding of the PDCCH transmission (e.g., attempt to decode using at least one decoding hypothesis for each different DCI bit length), resulting in inefficiency and increased UE power consumption.

According to various aspects, multiple decoding may be reduced by configuring the UE to select between a first decoding hypothesis corresponding to DCI including a bit field including a beam switch command and a second decoding hypothesis corresponding to the DCI not including the bit field. The UE may then decode the PDCCH transmission in accordance with the configuration information, using the decoding hypotheses the UE is configured to select, to obtain decoded DCI. The UE may communicate with the base station based on the decoded DCI.

A method of wireless communication by a UE is described. The method may include establishing a connection with a base station using a first transmission beam, receiving configuration information configuring the UE to select between a first decoding hypothesis corresponding to DCI including a bit field including a beam switch command and a second decoding hypothesis corresponding to the DCI not including the bit field, receiving a downlink control channel transmission via the first transmission beam, decoding the downlink control channel transmission in accordance with the configuration information to obtain decoded DCI, and communicating with the base station based on the decoded DCI.

An apparatus for wireless communication by a UE is described. The apparatus may include a processor, memory in electronic communication with the processor, and instructions stored in the memory. The instructions may be executable by the processor to cause the apparatus to establish a connection with a base station using a first transmission beam, receive configuration information configuring the UE to select between a first decoding hypothesis corresponding to DCI including a bit field including a beam switch command and a second decoding hypothesis corresponding to the DCI not including the bit field, receive a downlink control channel transmission via the first transmission beam, decode the downlink control channel transmission in accordance with the configuration information to obtain decoded DCI, and communicate with the base station based on the decoded DCI.

Another apparatus for wireless communication by a UE is described. The apparatus may include means for establishing a connection with a base station using a first transmission beam, means for receiving configuration information configuring the UE to select between a first decoding hypothesis corresponding to DCI including a bit field including a beam switch command and a second decoding hypothesis corresponding to the DCI not including the bit field, means for receiving a downlink control channel transmission via the first transmission beam, means for decoding the downlink control channel transmission in accordance with the configuration information to obtain decoded DCI, and means for communicating with the base station based on the decoded DCI.

A non-transitory computer-readable medium storing code for wireless communication by a UE is described. The code may include instructions executable by a processor to establish a connection with a base station using a first transmission beam, receive configuration information configuring the UE to select between a first decoding hypothesis corresponding to DCI including a bit field including a beam switch command and a second decoding hypothesis corresponding to the DCI not including the bit field, receive a downlink control channel transmission via the first transmission beam, decode the downlink control channel transmission in accordance with the configuration information to obtain decoded DCI, and communicate with the base station based on the decoded DCI.

In some examples of the method, apparatuses, and non-transitory computer-readable medium described herein, the configuration information configures the UE to select the first decoding hypothesis in a first set of control resources and the second decoding hypothesis in a second set of control resources that is different from the first set of control resources.

In some examples of the method, apparatuses, and non-transitory computer-readable medium described herein, the configuration information configures the UE to select between a first subset of a set of DCI decoding hypotheses that include the bit field, and a second subset of DCI of the set of DCI decoding hypotheses that do not include the bit field.

Some examples of the method, apparatuses, and non-transitory computer-readable medium described herein may further include operations, features, means, or instructions for selecting, based on the configuration information, the first decoding hypothesis from the first subset of the set of DCI decoding hypotheses for decoding of the downlink control channel transmission to obtain the decoded DCI and identifying the bit field including the beam switch command within the decoded DCI.

In some examples of the method, apparatuses, and non-transitory computer-readable medium described herein, the bit field may be identified based on one or more of a configuration of a DCI format, a transmission rank indicator, or an indication provided in RRC signaling.

In some examples of the method, apparatuses, and non-transitory computer-readable medium described herein, the configuration information includes an indication that the first decoding hypothesis or the second decoding hypothesis may be to be used to blind decode the DCI, or that both the first decoding hypothesis and the second decoding hypothesis may be to be used to blind decode the DCI.

In some examples of the method, apparatuses, and non-transitory computer-readable medium described herein, receiving the configuration information further includes receiving the configuration information by at least radio resource control signaling.

In some examples of the method, apparatuses, and non-transitory computer-readable medium described herein, the decoding the downlink control channel transmission further includes blind decoding the downlink control channel transmission in accordance with the first decoding hypothesis and blind decoding the downlink control channel transmission in accordance with the second decoding hypothesis.

Some examples of the method, apparatuses, and non-transitory computer-readable medium described herein may further include operations, features, means, or instructions for identifying the beam switch command based on the decoded DCI, modifying one or more beamforming parameters based on the beam switch command and receiving, in accordance with the modified one or more beamforming parameters, one or more subsequent downlink transmissions via a second transmission beam.

In some examples of the method, apparatuses, and non-transitory computer-readable medium described herein, the modifying the one or more beamforming parameters includes identifying the one or more beamforming parameters based on the beam switch command.

In some examples of the method, apparatuses, and non-transitory computer-readable medium described herein, the beam switch command includes one or more of a beam index or a beam tag that may be mapped to the one or more beamforming parameters, and timing information indicating when the second transmission beam may be to be used.

A method of wireless communication at a base station is described. The method may include establishing a connection with a UE using a first transmission beam, transmitting configuration information to configure the UE to select between a first decoding hypothesis corresponding to DCI including a bit field including a beam switch command and a second decoding hypothesis corresponding to the DCI not including the bit field, generating a downlink control channel transmission in accordance with the configuration information, and transmitting the downlink control channel transmission via the first transmission beam.

An apparatus for wireless communication at a base station is described. The apparatus may include a processor, memory in electronic communication with the processor, and instructions stored in the memory. The instructions may be executable by the processor to cause the apparatus to establish a connection with a UE using a first transmission beam, transmit configuration information to configure the UE to select between a first decoding hypothesis corresponding to DCI including a bit field including a beam switch command and a second decoding hypothesis corresponding to the DCI not including the bit field, generate a downlink control channel transmission in accordance with the configuration information, and transmit the downlink control channel transmission via the first transmission beam.

Another apparatus for wireless communication at a base station is described. The apparatus may include means for establishing a connection with a UE using a first transmission beam, means for transmitting configuration information to configure the UE to select between a first decoding hypothesis corresponding to DCI including a bit field including a beam switch command and a second decoding hypothesis corresponding to the DCI not including the bit field, means for generating a downlink control channel transmission in accordance with the configuration information, and means for transmitting the downlink control channel transmission via the first transmission beam.

A non-transitory computer-readable medium storing code for wireless communication at a base station is described. The code may include instructions executable by a processor to establish a connection with a UE using a first transmission beam, transmit configuration information to configure the UE to select between a first decoding hypothesis corresponding to DCI including a bit field including a beam switch command and a second decoding hypothesis corresponding to the DCI not including the bit field, generate a downlink control channel transmission in accordance with the configuration information, and transmit the downlink control channel transmission via the first transmission beam.

In some examples of the method, apparatuses, and non-transitory computer-readable medium described herein, the configuration information configures the UE to select between a first subset of a set of DCI decoding hypotheses that correspond to DCI including the bit field, and a second subset of the set of DCI decoding hypotheses that correspond to DCI not including the bit field.

In some examples of the method, apparatuses, and non-transitory computer-readable medium described herein, transmitting the configuration information further includes transmitting the configuration information by at least radio resource control signaling.

In some examples of the method, apparatuses, and non-transitory computer-readable medium described herein, the configuration information includes an indication to the UE that the first decoding hypothesis or second decoding hypothesis may be to be used to blind decode the DCI, or that both the first decoding hypothesis and the second decoding hypothesis may be to be used to blind decode the DCI.

In some examples of the method, apparatuses, and non-transitory computer-readable medium described herein, the beam switch command includes one or more of a beam index or a beam tag that may be mapped to one or more beamforming parameters of the second transmission beam, and timing information indicating when the second transmission beam may be to be used.

DETAILED DESCRIPTION

Figure 1:
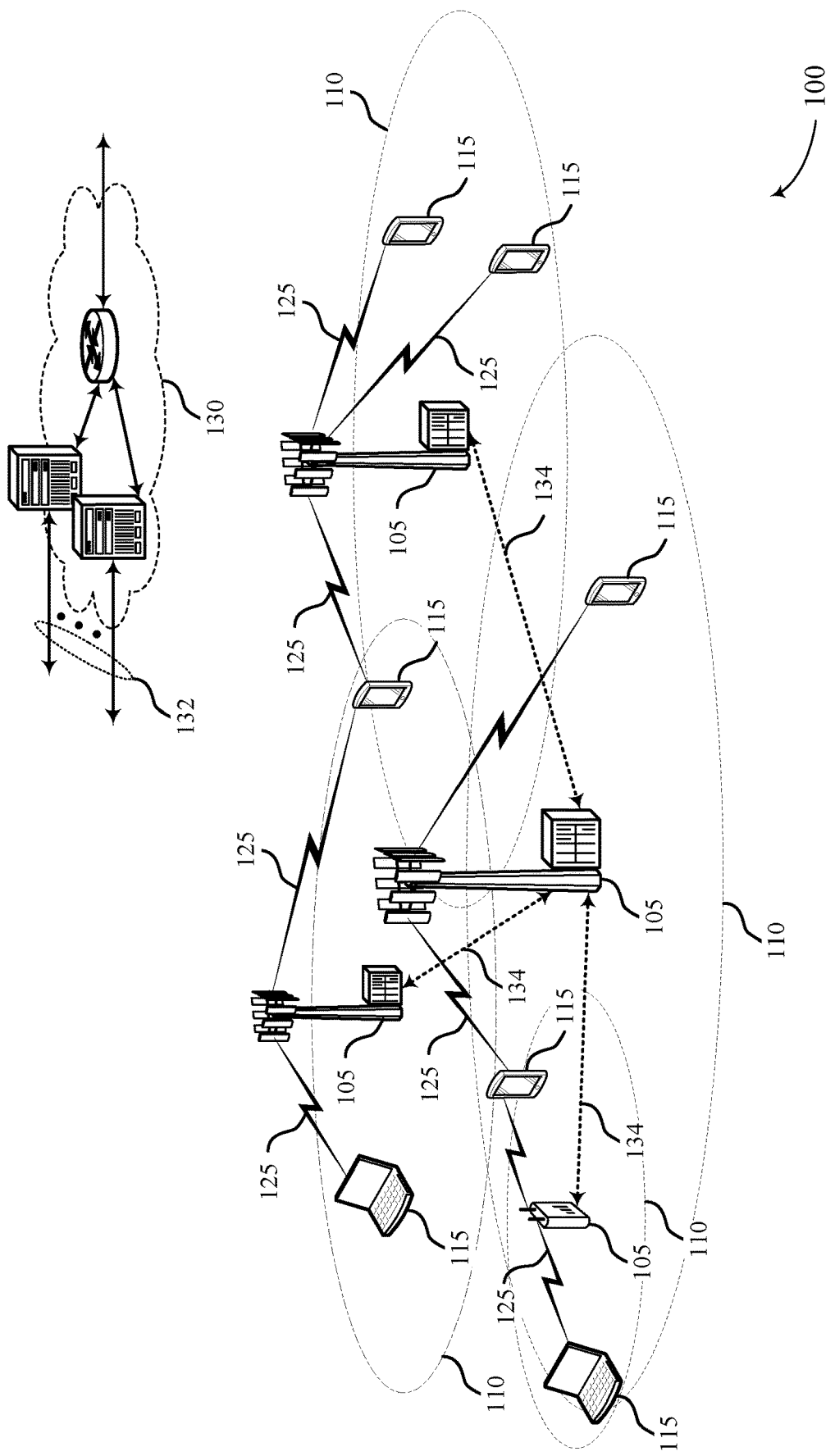
FIG. 1 illustrates an example of a system for wireless communication that supports transmission of beam switch commands through control channel signaling in accordance with aspects of the present disclosure.

The described techniques relate to improved methods, systems, devices, or apparatuses that support transmission of beam switch commands through control channel signaling. Generally, the techniques provide for configuring a user equipment (UE) to select between different decoding hypotheses for blind decoding of a control channel transmission based on whether downlink control information (DCI) includes a beam switch command.

In some examples, a physical downlink control channel (PDCCH) transmission may include DCI that conditionally includes a field for a beam switch command. The UE may identify the beam switch command, if any, by blind decoding the PDCCH transmission according to one or more different decoding hypotheses, and perform a beam switch operation based on the beam switch command. In some examples, the UE may need to perform multiple blind decodings (e.g., for a given DCI format) since the UE may not know whether the DCI within the PDCCH transmission includes the field for the beam switching command. The decoding hypotheses vary depending on supported or configured DCI formats or bit lengths, and whether the DCI includes the field for the beam switching command. Thus, the UE may perform multiple decoding of the PDCCH transmission (e.g., attempt to decode using at least one decoding hypothesis for each different DCI bit length or DCI format), resulting in inefficiency and increased UE power consumption.

According to various aspects, the number of blind decodings (e.g., for a given DCI format) may be reduced or minimized by configuring the UE to select between a first decoding hypothesis corresponding to DCI including a bit field including a beam switch command and a second decoding hypothesis corresponding to the DCI not including the bit field. The UE may then decode the PDCCH transmission in accordance with the configuration information, using only the decoding hypotheses the UE is configured to select. This may reduce a burden of blind decoding at the UE because a number of blind decoding candidates (e.g., blind decoding hypotheses) is reduced.

In some cases, one or more DCI formats may include a dedicated field with a beam switching command, and a UE may blind decode the DCI format(s) based on a set of blind decoding hypotheses and identify the DCI and any beam switch command that may be included therein. Additionally or alternatively, the DCI may include an activation bit that indicates whether a dedicated field with the beam switch command of the DCI is active. In some cases, one or more DCI fields may be reused for beam switch commands.

As indicated above, in mmW systems a base station and UE may communicate via one or more directional beams, and a base station may engage in a beam sweeping operation to establish an active transmit beam with a UE. A base station may also engage in beam tracking to maintain a connection with a UE. In some cases, as a UE moves relative to the base station, the base station may provide an indication to the UE that one or more beamforming parameters are to be modified, in order to maintain a connection with the UE. Such an indication to modify beamforming parameters may be referred to as a beam switch command, and may allow the connection between the base station and the UE to maintain higher gain beams. For example, a UE may establish two active beam pairs, and use a first active beam pair for transmissions. Based on movement of the UE, or some other interference (e.g., a user's hand blocking a UE antenna), it may be determined that transmissions should be made using the second active beam pair. In some cases, at the same time, refinement or recovery of the first active beam pair can be performed as a background process.

In some cases, beam switch commands may be provided through DCI. In some cases, different DCI formats have different DCI sizes, and a UE may perform blind decoding on a number of different DCI sizes to decode the information in the DCI. According to various techniques provided herein, a beam switch command may be conditionally provided in certain DCI formats without substantially increasing the number of blind decodes for the DCI formats. Such techniques may enhance UE efficiency and power consumption by reducing a number of blind decodes at the UE, and may also enhance network efficiency by reducing the likelihood of blind decoding failures and by allowing more efficient maintenance of beams with higher gain. In some cases, a DCI format including a beam switch command may be derived from another DCI format, with an appended beam switch field. The beam switch field may be set at a number of bits, and if a beam switch payload is not included or smaller than the number of bits, padding bits may be used. Thus, a same blind decoding hypothesis can be used for the appended beam switch DCI field irrespective of a payload size. In some cases, a format type indicator (or a format type identifier) or activation bit may be included with the DCI to indicate the DCI format. For example, a format type identifier may be embedded in a payload of the DCI so as to allow the UE to distinguish different DCI formats having a same size.

In some cases, one or more DCI fields may be reused for a beam switch command. For example, a DCI format may include separate fields for two codewords (CWs), such as fields for indicating a modulation and coding scheme for multiple transmission layers mapped from two CWs. In some cases, a number of transmission layers may be limited so that only one CW is transmitted, and DCI for the transmission layers may contain information for a single CW (e.g., rank or modulation and coding scheme (MCS)). In such cases, the DCI field for the second CW may be used to transmit the beam switch command. In some cases, a base station may configure a UE to reuse the DCI field for the second CW as a beam switch command based on a maximum number of CWs at the UE when using beamformed transmissions.

As indicated above, such techniques may enhance UE efficiency and power consumption by reducing a number of blind decodes at the UE. Furthermore, in cases where a UE is moving within a system, such techniques may allow for more accurate information (e.g., more accurate beams) that may be used in subsequent transmissions which may provide enhanced likelihood of successful receipt of transmitted data at the UE and base station. Additionally, in cases where mmW transmissions use a shared or unlicensed frequency spectrum band, a reduced number of transmissions between a UE and a base station is beneficial because it reduces the likelihood that transmissions will be interrupted in the event that a different transmitter obtains the wireless channel.

Aspects of the disclosure are initially described in the context of a wireless communications system. Various examples of DCI formats are then described. Aspects of the disclosure are further illustrated by and described with reference to apparatus diagrams, system diagrams, and flowcharts that relate to transmission of beam switch commands through control channel signaling.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 are supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Mobile Telecommunications System (UMTS) Terrestrial Radio Access (E-UTRA) Absolute Radio Frequency Channel Number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers. In some cases, a first CC may be a low-band carrier and a second CC may be a high-band carrier that uses mmW beamformed transmissions.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115).

In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device). In some cases, a base station 105 may transmit a beam switch command to a UE 115 based on, for example, gain measurements associated with one or more different beams.

Various techniques as discussed herein provide for transmitting of such a beam switch command. In some cases, a base station 105 may transmit a beam switch command to a UE 115 via control channel signaling, such as in a PDCCH transmission that includes DCI with a beam switch command. The UE 115 may identify the beam switch command, and modify one or more beamforming parameters to switch transmit and/or receive beams. In some cases, a DCI format may include a dedicated field that may include the beam switch command, and a UE 115 may blind decode the DCI based on a set of blind decoding hypotheses corresponding to DCI payloads having differing numbers of bits, and identify the DCI format and any beam switch command that may be included therein. In some cases, the DCI may include an activation bit that indicates whether the beam switch command of the DCI is active. In some cases, one or more DCI fields may be reused for beam switch commands.

Figure 2:
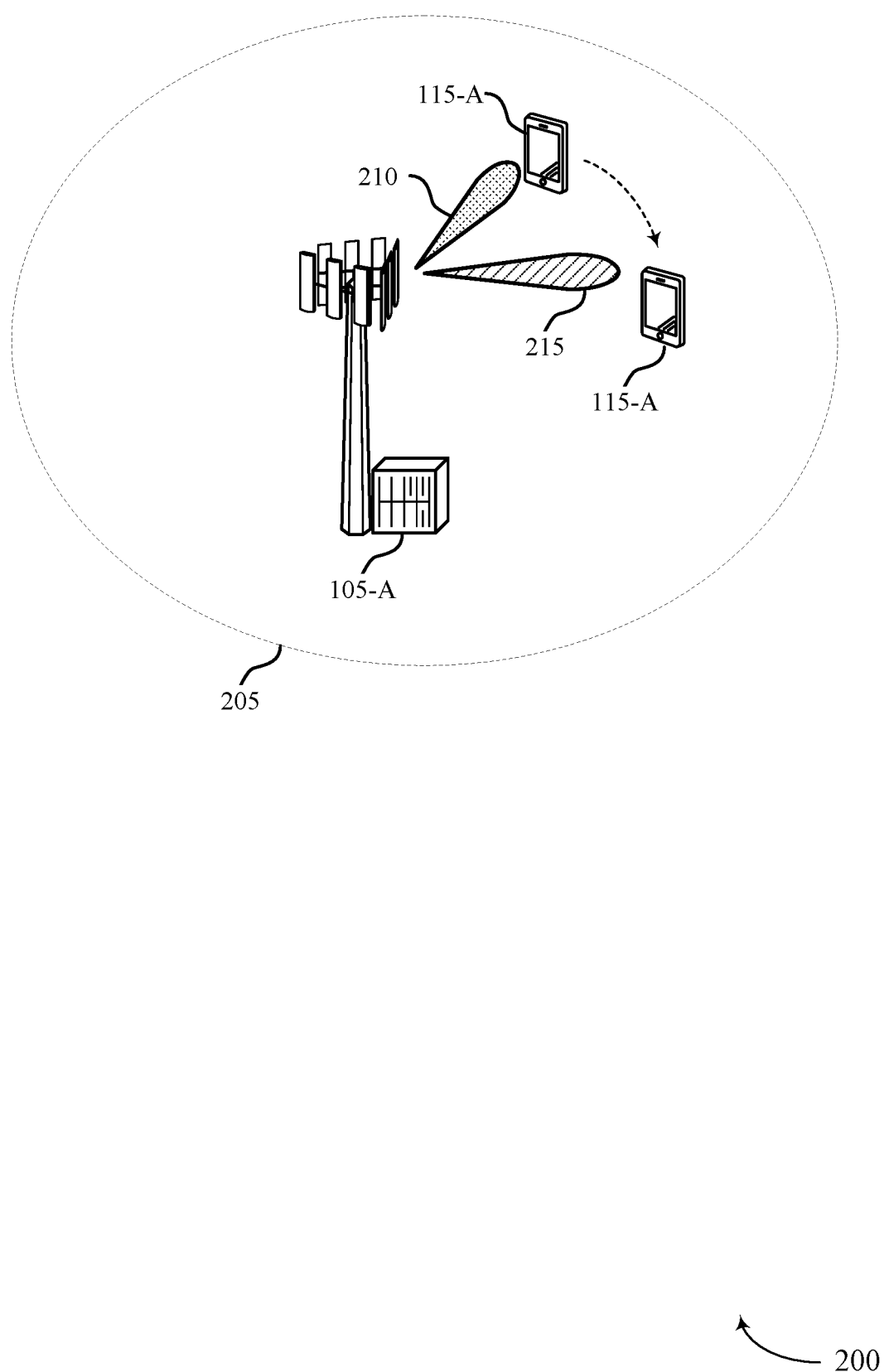
FIG. 2 illustrates an example of a portion of a wireless communication system that supports transmission of beam switch commands through control channel signaling in accordance with aspects of the present disclosure.

FIG. 2 illustrates an example of a wireless communication system 200 that supports transmission of beam switch commands through control channel signaling in accordance with various aspects of the present disclosure. In some examples, wireless communication system 200 may implement aspects of wireless communication system 100. Wireless communication system 200 may include a base station 105-a and a UE 115-a, which may be examples of the corresponding devices described with reference to FIG. 1. The base station 105-a and UE 115-a may be within a geographical coverage area 205 of the base station 105-a, and may communicate using one or more directional beams.

In the example of FIG. 2, the UE 115-a may be located at a first location within the geographical coverage area 205, and may receive downlink transmissions from the base station 105-a in a first downlink transmission beam 210. At some later time, the UE 115-a may move to a second location within the geographical coverage area 205, such that the first downlink transmission beam 210 may no longer be a preferred transmission beam for transmissions to the UE 115-a. In such cases, the base station 105-b and the UE 115-a may switch to a second downlink transmission beam 215, which may provide enhanced performance relative to the first downlink transmission beam 210 at the second location. While the example of FIG. 2 illustrates downlink transmission beams 210 and 215, techniques as discussed herein may also be applied to uplink transmission beams from the UE 115-a to the base station 105-a. In some cases, beam reciprocity may be used to modify both downlink and uplink beamforming parameters as part of switching from the first downlink transmission beam 210 to the second downlink transmission beam 215.

In some examples, the base station 105-a may transmit a beam switch command to the UE 115-a. For example, the base station 105-a, following establishment of the downlink transmission beam 210, may engage in a beam tracking operation (e.g., based on gain measurements of received transmissions from the UE 115-a, reported measurements from the UE 115-a, one or more beam refinement signals, or any combination thereof) to maintain a connection with the UE 115-a, and may determine that a beam switch to the second downlink transmission beam 215 should be performed. The base station 105-a may signal a beam switch command to the UE 115-a to perform beam switching, and one or more subsequent transmissions to the UE 115-a may be made using the second downlink transmission beam 215.

Figure 3:
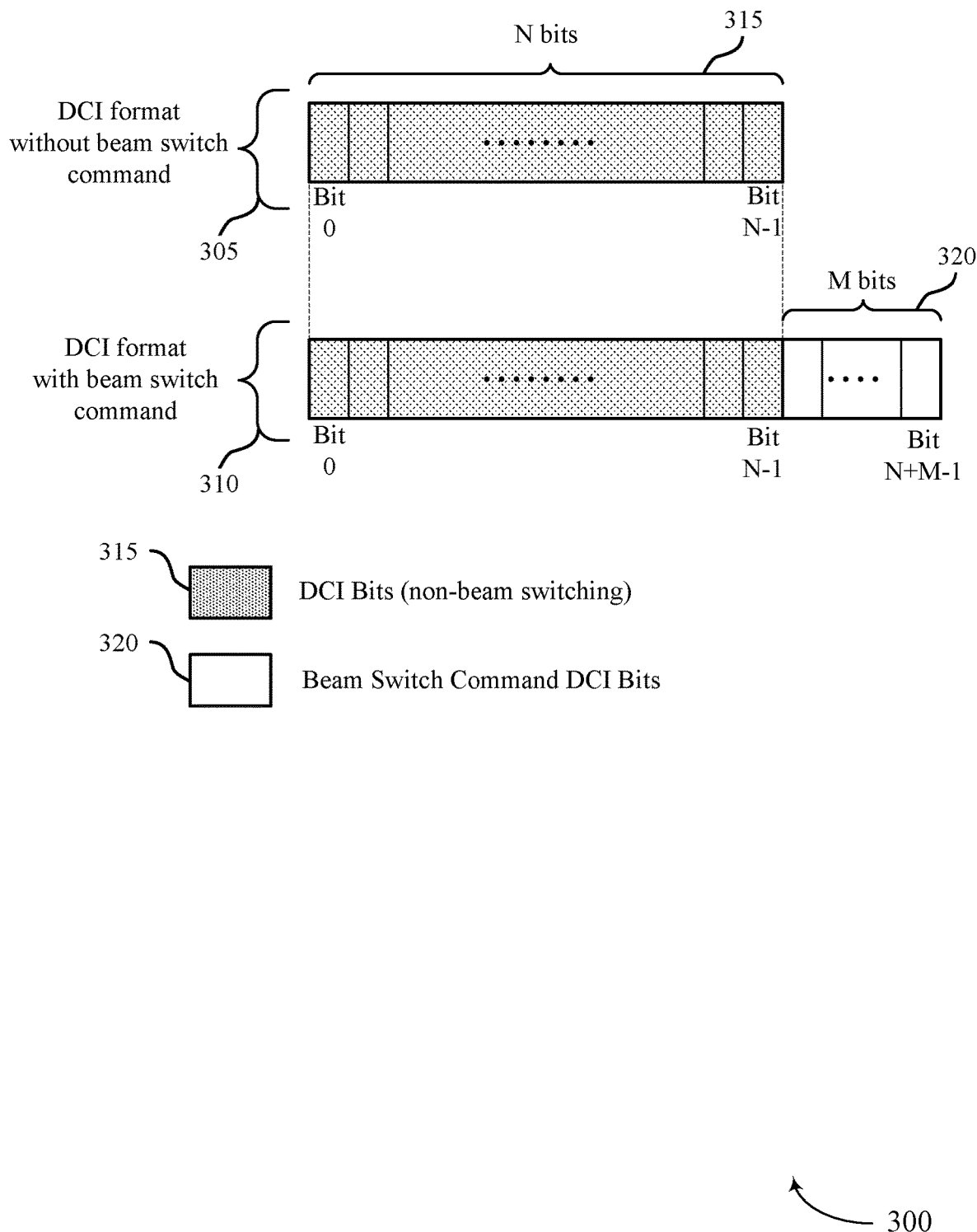
FIG. 3 illustrates an example of a DCI format that supports transmission of beam switch commands through control channel signaling in accordance with aspects of the present disclosure.
Figure 4:
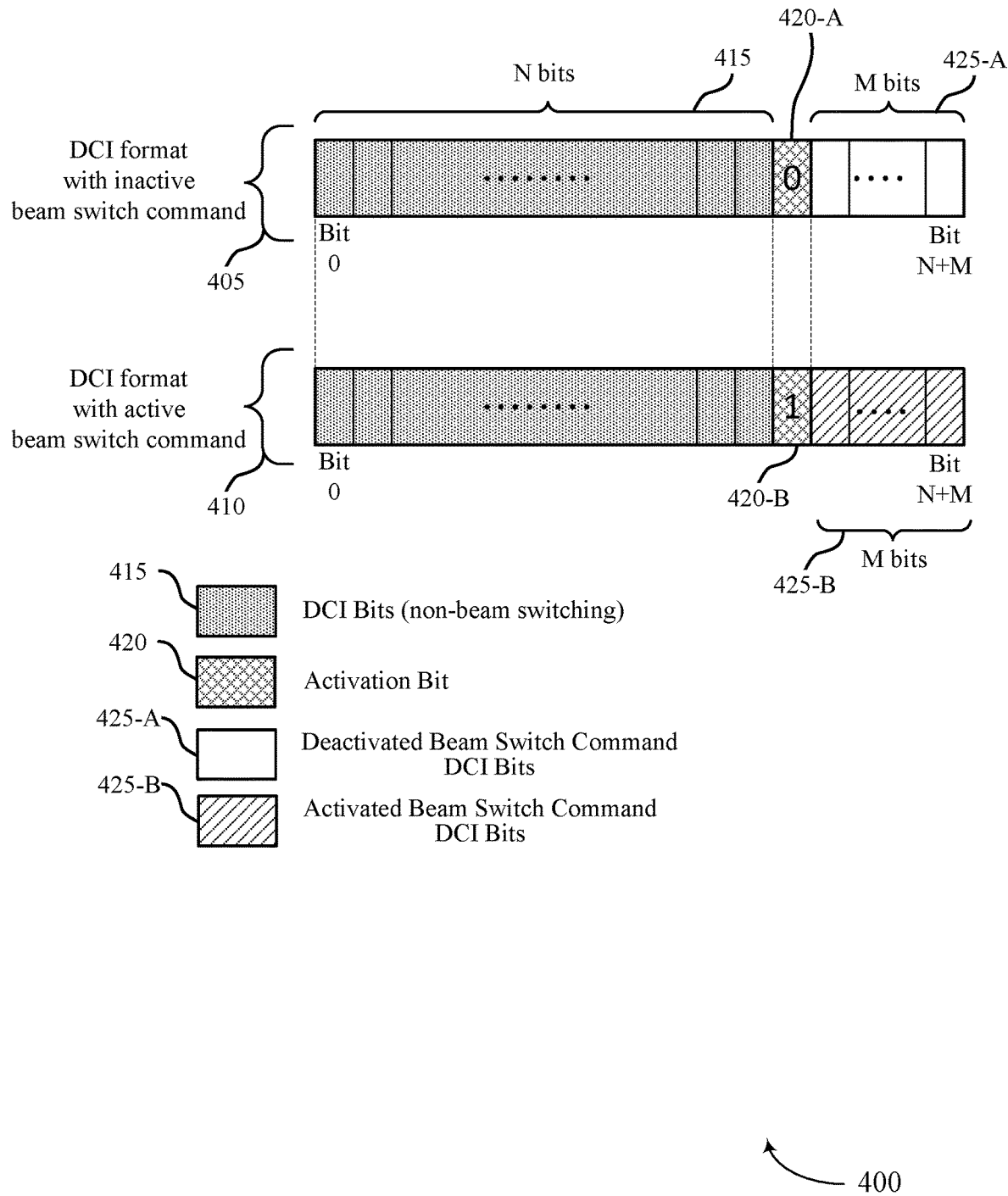
FIG. 4 illustrates an example of another DCI format that supports transmission of beam switch commands through control channel signaling in accordance with aspects of the present disclosure.
Figure 5:
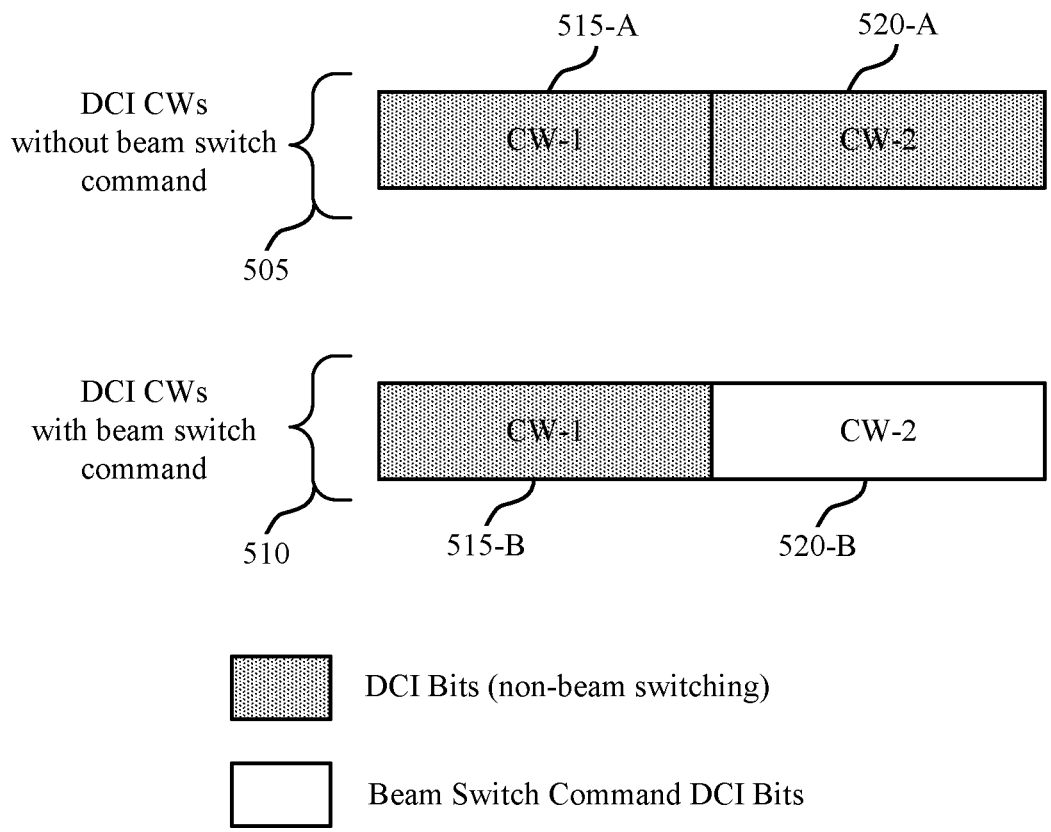
FIG. 5 illustrates an example of another DCI format that supports transmission of beam switch commands through control channel signaling in accordance with aspects of the present disclosure.

As indicated above, in some cases, the beam switch command may be transmitted in DCI on a PDCCH transmission. In some cases, a beam switch DCI format may be derived from another DCI format, with an appended beam switch field, such as illustrated in FIGS. 3 and 4. For example, a DCI format with a beam switch command may be derived from a DCI format without a beam switch command by appending a beam switch field. In such scenario, the UE may be configured to monitor both the DCI format without a beam switch command and the derived DCI format, and may perform beam switch if the UE detects the derived DCI format with beam switch field. The size of the beam switch field may be set to a number of bits, and if a beam switch payload is smaller than the number of bits, padding bits may be used. Thus, a same blind decoding hypothesis can be used for the DCI format with appended beam switch field irrespective of a payload size. Additionally or alternatively, a format type indicator or activation bit may be included with the DCI to indicate the DCI format or activation of the beam switch field. In other cases, such as illustrated in FIG. 5, one or more DCI fields may be reused for a beam switch command.

FIG. 3 illustrates an example of a DCI format 300 that supports transmission of beam switch commands through control channel signaling in accordance with various aspects of the present disclosure. In some examples, DCI format 300 may be used to provide DCI in wireless communication system 100 or 200. In this example, a first decoding hypothesis 305 for the DCI format 300 may provide DCI that does not include a beam switch command, and a second decoding hypothesis 310 for the DCI format 300 may provide DCI that does include the beam switch command.

In the example of FIG. 3, a first number of bits 315 may include DCI bit 0 through bit N-1. The first number of bits 315, in some cases, may correspond to a DCI size of the DCI format 300 that may be used to indicate DCI information that does not include beam switch information. For example, the first number of bits 315 may carry an uplink resource allocation for a subsequent uplink transmission, information about downlink data that is to be transmitted to a UE 115, information related to downlink transmissions to the UE 115 (e.g., MCS information), uplink power control information, or any combination thereof. In some cases, DCI information may be formatted according to a number of established DCI formats, such as formats for uplink scheduling, formats for Non-MIMO downlink scheduling, formats for MIMO downlink scheduling, formats for uplink power control, or the like. Each DCI format may have a different number of bits, and a UE 115 receiving the DCI may perform blind decoding based on the different alternatives of DCI length to decode the DCI and identify the information contained therein.

As indicated above, it may be desirable to have a UE 115 perform relatively few blind decodes. Thus, in some cases, a second number of beam switch command DCI bits 320 may be appended to the first number of bits 315, which may contain a beam switch command for the DCI format 300. A UE 115 may then perform a first blind decode assuming the first decoding hypothesis 305 and, if the blind decode is unsuccessful, may perform a second blind decode assuming the second decoding hypothesis 310. In either case, the first number of bits 315 may be decoded and associated DCI identified. In cases where the blind decoding of the second decoding hypothesis 310 is successful, the UE 115 may also decode the beam switch command that is included in M bits of the second number of beam switch command DCI bits 320. In some cases, the second number of beam switch command DCI bits 320 may include an index or tag associated with a beam that is to be switched to, and time to switch. In some cases, the index or tag may be mapped to one or more beamforming parameters for the new beam, or may be used to derive updated beamforming parameters. The UE 115 may then use the modified beamforming parameters to receive subsequent downlink transmissions, transmit subsequent uplink transmissions, or combinations thereof. In some cases, a beam switch command may not occupy all M bits of the second number of beam switch command DCI bits 320, and padding (e.g., zero-padding) may be used for remaining bits of the second number of beam switch command DCI bits 320.

As indicated above, in some cases a UE 115 may blind decode downlink control channel transmissions to identify the DCI. In some cases, a number of blind decodes may be reduced though one or more configurations that may be provided to the UE 115. In some examples, the UE 115 may be configured (e.g., via higher layer signaling such as RRC signaling or in a medium access control (MAC) control element (CE)) with a set of hypotheses of DCI formats for use in blind decoding. For example, the UE 115 may be configured with a first subset of DCI formats or decoding hypotheses that include the one or more bit fields including the beam switch command, and a second subset of DCI formats or decoding hypotheses in which the one or more bit fields including the beam switch command are absent. In some cases, the second subset of DCI formats may be a subset of the first subset of DCI formats (e.g., different decoding hypotheses for some or all of a set of DCI formats). The base station 105 may identify that beam switching may not be needed for the UE 115, such as if the UE 115 is stationary or has not moved for a certain time period, and may signal to the UE 115 that only the second subset of DCI formats or decoding hypotheses may be transmitted. Such a UE 115 may then perform blind decoding using the second subset of DCI formats or decoding hypotheses, which may reduce the burden of blind decoding at the UE 115 because the number of blind decoding candidates is reduced. In other examples, the base station 105 may configure the UE 115 to perform blind decoding on the second subset of DCI formats or decoding hypotheses, followed by blind decoding of DCI formats in the first subset of DCI formats not included in the second subset of DCI formats, and thus the blind decoding operation proceeds beyond the second subset of DCI formats in cases where a beam switch command is transmitted.

In some cases, multiple sets of control resources may be configured for the UE 115 to monitor. For example, the UE 115 may monitor multiple control channels (e.g., PDCCH, enhanced PDCCH (ePDCCH), shortened PDCCH (sPDCCH)) in LTE or multiple control resource sets (CORESETs) in NR. If, for example, there are multiple sets of control resources configured for a UE 115 to monitor, the configuration information may configure the UE 115 to use one or more hypotheses for decoding a first set of control resources, one or more different hypotheses for decoding a second set of control resource, and so forth for any additional sets of control resources. In an example, a first decoding hypothesis 305 may correspond to a first CORESET and a second decoding hypothesis 310 may correspond to a second CORESET. In such case, configuration information (e.g., RRC signaling) may configure the UE 115 to select the first decoding hypothesis in a first CORESET and the second decoding hypothesis in a second CORESET that is different from the first CORESET. The UE 115 may select, based on the configuration information, the first decoding hypothesis 305 when attempting to decode the first CORESET and the second decoding hypothesis 310 when attempting to decode the second CORESET. Additionally or alternatively, the configuration information may configure the UE to use different hypotheses for different search spaces or search space sets within a CORESET. Thus, the UE 115 may decode a set of control resources configured for the UE 115 using only a subset of decoding hypotheses corresponding to that set of control resources, thereby reducing the number of blind decodings that the UE 115 may perform.

FIG. 4 illustrates an example of another DCI format 400 that supports transmission of beam switch commands through control channel signaling in accordance with various aspects of the present disclosure. In some examples, DCI format 400 may be used to provide DCI in wireless communication system 100 or 200. In this example, a first DCI payload 405 for DCI format 400 may provide DCI that does not include a beam switch command, and a second DCI payload 410 for DCI format 400 may provide DCI that does include the beam switch command. Furthermore, in this example, an activation bit 420 may indicate whether beam switch command bits 425 are included following a first number of DCI bits 415.

In the example of FIG. 4, the first number of DCI bits 415 may include DCI bit 0 through bit N-1, and may be used to indicate DCI information that does not include beam switch information. For example, similarly as discussed above, the first number of bits 415 may carry an uplink resource allocation for a subsequent uplink transmission, information about downlink data that is to be transmitted to a UE, information related to downlink transmissions to the UE (e.g., MCS information), uplink power control information, or any combination thereof. In some cases, the first number of DCI bits 415 may be formatted according to a number of established DCI formats, such as formats for uplink scheduling, formats for Non-MIMO downlink scheduling, format for MIMO downlink scheduling, formats for uplink power control, or the like.

The UE 115 may perform blind decoding based on the first number of DCI bits 415, the activation bit 420, and the beam switch command DCI bits 425. In the case where a beam switch command is not included, such as in the first DCI payload 405, the activation bit 420-a may be set (e.g., to zero) to indicate that beam switch command DCI bits 425-a are deactivated, and thus the UE may ignore such bits and not attempt to parse or otherwise use such bits. In the case where a beam switch command is included, such as in the second DCI payload 410, the activation bit 420-b may be set (e.g., to one) to indicate that beam switch command DCI bits 425-b are activated, and thus the UE 115 may parse and use the additional bits to identify the beam switch command. The UE may perform a beam switch when the beam switch field is active (e.g., the activation bit 420-b is set). Thus, in this example, the DCI payloads of DCI format 400 with and without a beam switch command may have a same size, and the number of blind decodes performed at the UE 115 may be reduced.

Additionally or alternatively, a special DCI format may be defined that includes beam switch command information, and such a special DCI format may not contain other information (e.g., downlink or uplink scheduling assignment/grant information), or may contain such other information in addition to the beam switch command information. In some cases, the special DCI format may be a stand-alone DCI format that is not derived from another DCI format. In such cases, an additional blind decode may be added to a blind decoding operation at the UE 115 to blind decode the special DCI format.

FIG. 5 illustrates an example of another DCI format 500 that supports transmission of beam switch commands through control channel signaling in accordance with various aspects of the present disclosure. In some examples, DCI format 500 (of which only a portion may be illustrated in FIG. 5) may be used to provide DCI in wireless communication system 100 or 200. In this example, one or more existing DCI formats may include separate fields for two codewords (CWs), such as fields for indicating a modulation and coding scheme (MCS) for multiple transmission layers mapped from two CWs, namely a first CW 515 and a second CW 520. In some examples, each CW may use at least 5 bits for indicating MCS. When a transmission rank indicator (TRI) is less than or equal to 4, only the first CW 515 may be scheduled and the MCS field for the second CW remains unused. When sending a beam switch is desired, a number of CWs may be restricted to a single CW (e.g., via an RRC signaling), and the bit field for the second CW within the existing DCI formats may be reused for transmitting a beam switch command. In some cases, a base station 105 may configure a UE to reuse the DCI field for the second CW 520 as a beam switch command based on a maximum number of CWs at the UE when using beamformed transmissions.

Thus, in the example of FIG. 5, a first DCI payload 505 may include the first CW 515-a and the second CW 520-a. In this example, both the first CW 515-a and the second CW 520-a may be used for indicating a modulation and coding scheme for multiple transmission layers mapped from two CWs, such that both the first CW 515-*a* and the second CW 520-*a* have DCI bits that do not contain a beam switch command. In some cases, as indicated above, the number of transmission layers may be limited such that only one CW is transmitted. For example, in some mmW deployments, for practical reasons transmissions may be limited to rank 2. In such a case, a second DCI payload 510 may include the first CW 515-*b* that contains DCI for the transmission layers (e.g., rank or MCW), and bits in the second CW 520-*a* may be reused to provide beam switch command information in beam switch command DCI bits of the second CW 520-*b*. Thus, in such examples, instead of assigning a dedicated field for a beam switch command, some bit fields in existing DCI formats can be re-used, which may reduce a number of blind decode operations at a UE 115.

While the example of FIG. 5 discusses a DCI format that may provide MCS information (e.g., for a downlink scheduling assignment), other DCI bit fields may be re-used in other examples. In some cases, a base station 105 may identify that beam switching may be necessary for a UE 115, and in such cases the base station 105 may restrict the one or more parameters, which may fix parameters for some portion of DCI that may be re-used for beam switching. As discussed with respect to FIG. 5, the base station 105 may restrict a number of transmission layers (e.g., restrict a transmission rank indicator (TRI) to 2), and re-use certain DCI bits for beam switch command DCI bits. In some cases, when operating using mmW, such a restriction may always be in place. In other cases, such a restriction may be indicated in configuration information provided to the UE 115, such as via RRC signaling.

Figure 6:
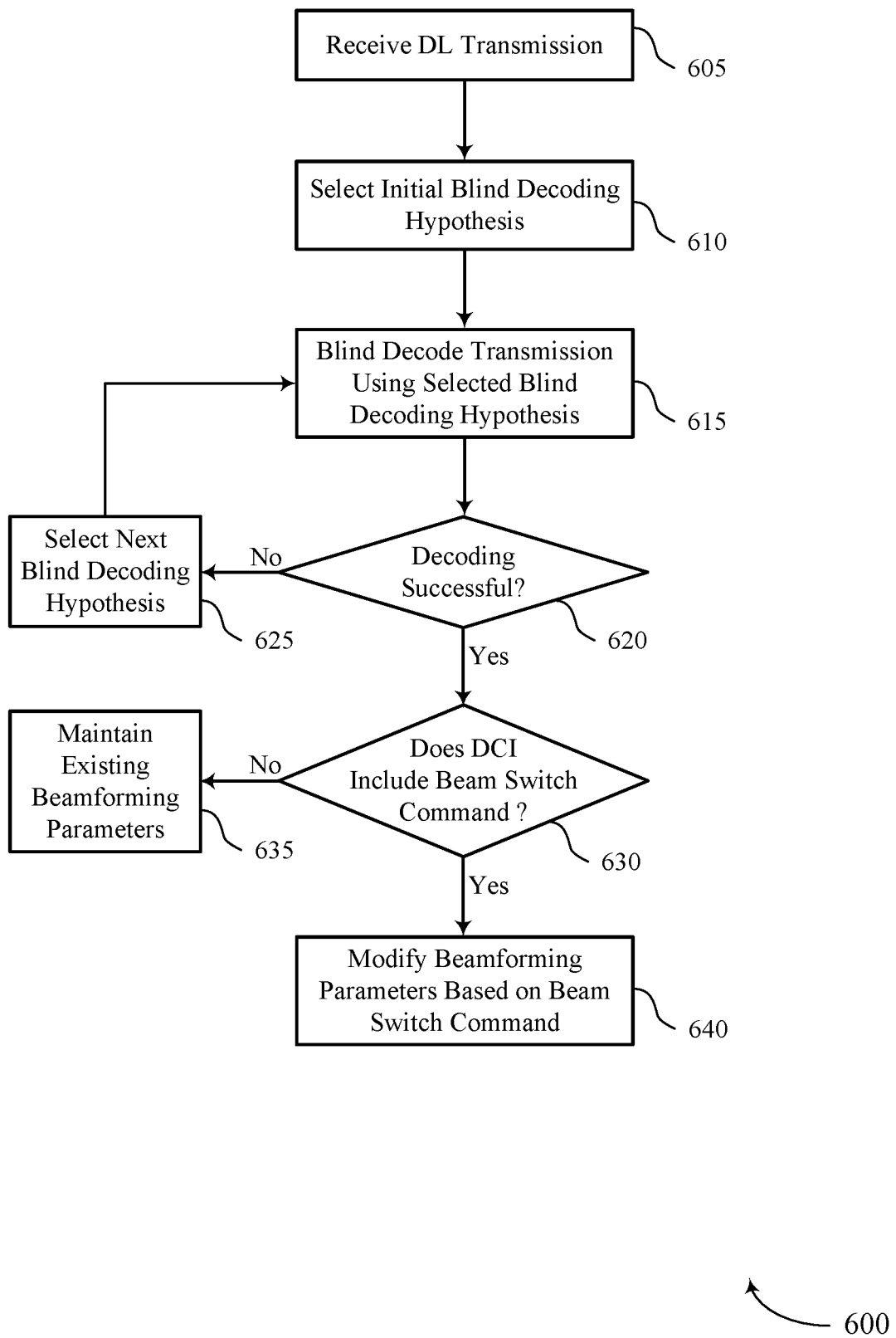
FIG. 6 illustrates an example of a method that supports transmission of beam switch commands through control channel signaling in accordance with aspects of the present disclosure.

FIG. 6 illustrates an example flow diagram 600 that supports transmission of beam switch commands through control channel signaling in accordance with various aspects of the present disclosure. In some examples, flow diagram 600 may be used to provide DCI in wireless communication system 100 or 200. The operations of flow diagram 600 may be performed by a receiver, such as a UE 115 discussed above with respect to FIGS. 1 and 2.

At block 605, the UE 115 may receive a downlink transmission. For example, the UE 115 may receive a downlink transmission from a base station 105. The downlink transmission may be transmitted, in some examples, using a first downlink transmission beam in a mmW system. The downlink transmission may be received at a receive chain in the UE 115, which may demodulate the downlink transmission and provide a number of modulation symbols to a decoder at the UE 115.

At block 610, the UE 115 may select an initial blind decoding hypothesis. In some cases, the initial blind decoding hypothesis may be selected based on a number of available DCI formats in which DCI may be transmitted. In some cases, a UE 115 may be configured with a set of DCI formats for performing blind decoding. In some cases, one DCI format may be prioritized for selection as the initial blind decoding hypothesis. In some examples, a first subset of blind decoding hypotheses may be configured that is a subset of a second subset of blind decoding hypotheses. In some cases, the first subset of blind decoding hypotheses may include DCI that does not contain a beam switch command, and the second subset of blind decoding hypotheses may contain DCI that does or does not contain a beam switch command. The UE 115 may be configured to use the first subset or the second subset, in some examples, via configuration information provided by the base station 105 (e.g., in cases where the base station 105 does or does not expect to perform beam switching).

At block 615, the UE 115 may blind decode the transmission using the selected blind decoding hypothesis. Such blind decoding may include, for example, attempting to decode the demodulated modulation symbols according to a size of the DCI of the selected decoding hypothesis.

At block 620, the UE 115 may determine if the decoding was successful. In some cases, the UE 115 may determine that the decoding was successful based on an output of the decoding operation and whether decoding results in output bits and Cyclic Redundancy Check (CRC) that indicate a successful decode. For example, the UE 115 may check a computed CRC with its corresponding Radio Network Temporary Identifier (RNTI). If the CRC is decoded successfully with that RNTI, the UE 115 may determine that the decoding was successful.

At block 625, if it is determined that the decoding was not successful, the UE 115 may select a next blind decoding hypothesis and repeat the operations of blocks 615 and 620. In some cases, the next blind decoding hypothesis selected by the UE 115 may correspond to a DCI that has not been attempted for blind decoding yet. In some cases, the UE 115 may select a DCI for blind decoding that is in the first subset of blind decoding hypotheses before selecting a DCI for blind decoding that is in the second subset (but not the first subset) of blind decoding hypotheses. In some cases, the UE 115 may attempt only decoding hypotheses in the first subset and, if a successful decode is not performed, may initiate a failure procedure.

If it is determined that the decoding was successful at block 620, the UE 115 may, at block 630, determine if the DCI includes a beam switch command. As discussed above, in some cases, such as discussed with respect to FIG. 3 above, the DCI may include the beam switch command in a field that is appended to other DCI fields. In some cases, such as discussed with respect to FIG. 4 above, a state of an activation bit may indicate whether an appended DCI field includes a beam switch command. In still further cases, such as discussed with respect to FIG. 6 above, one or more DCI fields may be re-used to indicate a beam switch command.

If the UE 115 determines that the DCI does not include a beam switch command, the UE 115 may, at block 635, maintain existing beamforming parameters. The UE 115 may use such existing beamforming parameters to receive a subsequent downlink transmission, or transmit an uplink transmission, an allocation of which may have been received in the DCI.

If the UE 115 determines that the DCI does include a beam switch command, the UE 115 may, at block 640, modify its beamforming parameters based at least in part on information in the beam switch command. In some cases, the beam switch command may include an index of a transmission beam to be used for a subsequent transmission. The index may be mapped to one or more beamforming parameters or values that may be used to derive the modified beamforming parameters, for example. In some cases, the beam switch command may include a time indication for a time at which the beam switch is to be made. The time indication may be, for example, an indication of a subframe or transmission time interval (TTI) where the modified beamforming parameters are to be used.

Figure 7:
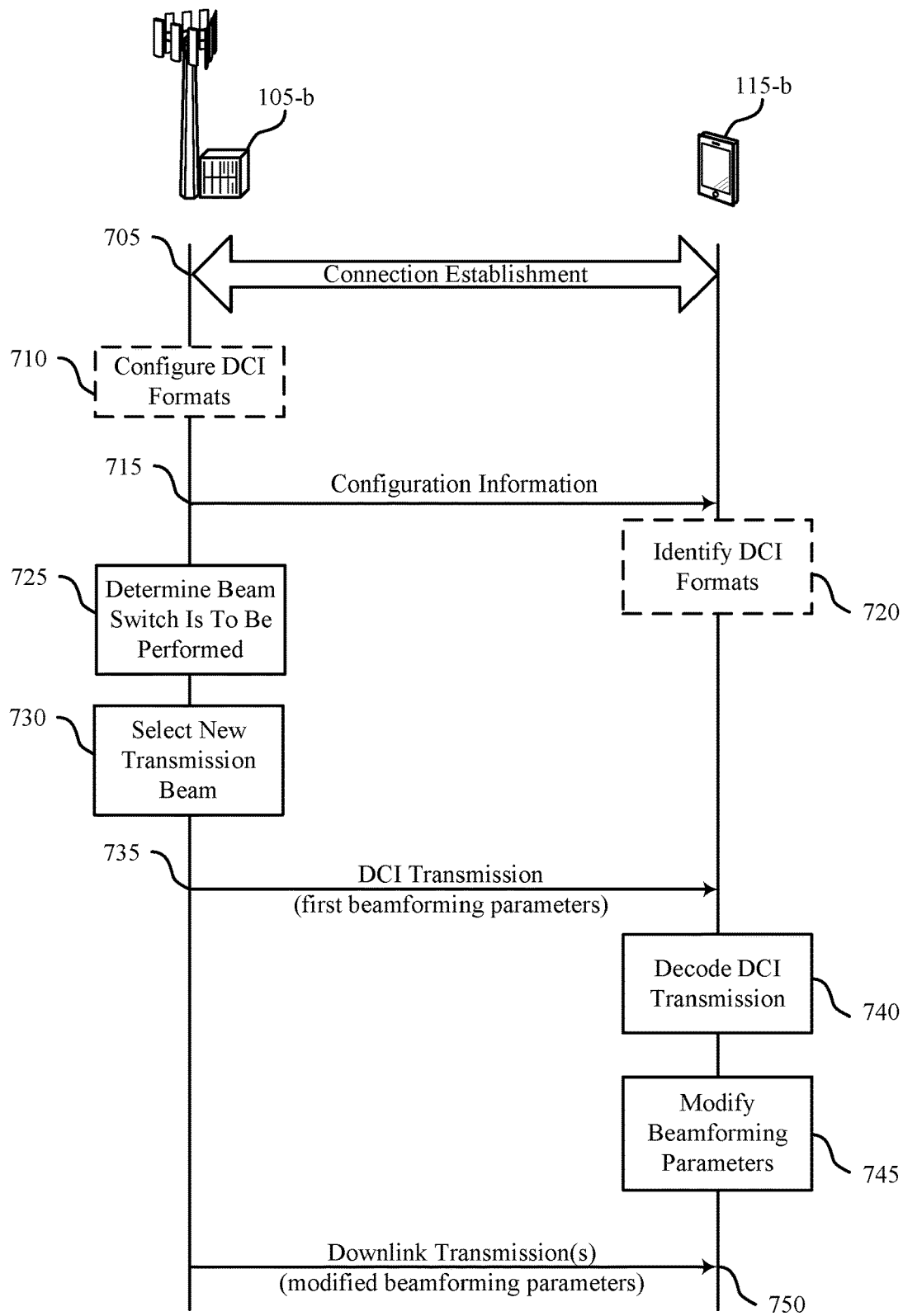
FIG. 7 illustrates an example of a process flow that supports transmission of beam switch commands through control channel signaling in accordance with aspects of the present disclosure.

FIG. 7 illustrates an example of a process flow 700 that supports transmission of beam switch commands through control channel signaling in accordance with various aspects of the present disclosure. In some examples, process flow 700 may implement aspects of wireless communication system 100 or 200. Process flow 700 may include the transmission of directional beams between a base station 105-b, which may be an example of a base station 105 of FIG. 1 or 2, and a UE 115-b, which may be an example of a UE 115 of FIG. 1 or 2. Initially, at 705, the base station 105-b and UE 115-b may establish a connection. Such a connection establishment may be performed using established connection establishment techniques.

At optional block 710, the base station 105-b may configure DCI formats. One or more of the DCI formats may be used, as discussed above, for transmission of DCI information from the base station 105-b to the UE 115-b. In some cases, the base station 105-b may configure a set of hypotheses of DCI formats for use in blind decoding. For example, the base station 105-b may configure a first subset of DCI formats that includes the one or more bit fields including the beam switch command, and a second subset of DCI formats in which the one or more bit fields including the beam switch command are absent. In some cases, the second subset of DCI formats may be a subset of the first subset of DCI formats. In some cases, the base station 105-b may configure an activation bit in the DCI that may activate or deactivate bits of an appended beam switch field. In still further cases, the base station 105-b may configure one or more DCI fields for re-use to indicate a beam switch command. The base station 105-b may transmit configuration information 715 to the UE 115-b, such as via higher layer signaling such as RRC signaling or in a MAC-CE.

At optional block 720, the UE 115-b may identify the configured DCI formats. In some cases, the UE 115-b may identify a set of hypotheses of DCI formats for use in blind decoding. For example, the configuration information 715 may configure a first subset of DCI formats and second subset of DCI formats, as discussed above. In some cases, also as discussed above, the configuration information 715 may configure an activation bit in the DCI that may activate or deactivate bits of an appended beam switch field. In still further cases, the configuration information 715 may configure one or more DCI fields for re-use to indicate a beam switch command.

At block 725, the base station 105-b may determine that a beam switch is to be performed. In some cases, such a determination may be made based on one or more measurements associated with an uplink or downlink transmission beam to the UE 115-b. In some cases, the one or more measurements may be gain measurements made on an uplink transmission beam or a downlink transmission beam, and the base station 105-b may determine that the beam switch is to be performed if a gain measurement falls below a threshold value or below a gain measurement associated with another transmission beams. In some cases, the measurements may be made based on one or more beam refinement signals transmitted from the UE 115-b or from the base station 105-b.

At block 730, the base station 105-b may select a new transmission beam for transmissions to the UE 115-b. In some cases, the new transmission beam may be selected that has a higher gain than an existing transmission beam established with the UE 115-b. In some cases, the new transmission beam may be selected based on beamforming parameters of one or more of the beam refinement signals.

The base station 105-b may transmit a beam switch command in DCI transmission 735, which may be transmitted using first beamforming parameters of the established transmission beam with the UE 115-b. The DCI transmission 735 may include the beam switch command, which may indicate that beamforming parameters for the new transmission beam. The beam switch command may include, for example, in indication of the new beam (e.g., a beam index or tag), and a time for starting to use the new beam.

At block 740, the UE 115-b may receive and decode the DCI transmission. In some cases, the DCI may be decoded according to a blind decoding operation in which one or more blind decoding hypotheses are attempted on the DCI to determine whether the DCI is successfully received or not. In cases, where the DCI includes a beam switch command, the beam switch command information may be decoded as well.

At block 745, the UE 115-b may modify its beamforming parameters. In some cases, the beamforming parameters may be modified based on the beam switch command that was decoded from the DCI transmission 735. In some cases, the beamforming parameters may be modified based on an index or tag in the beam switch command, which may indicate a particular set of beamforming parameters that are to be used for the new transmission beam. The beamforming parameters may also include a time at which the switch is to be made.

The base station 105-b may transmit one or more subsequent downlink transmission(s) 750 using the new transmission beam and modified beamforming parameters. The subsequent downlink transmission(s) 750 may start after the time indicated in the beam switch command, in some cases. The UE 115-b may receive the subsequent downlink transmission(s) 750 using the modified beamforming parameters.

While the modified beamforming parameters are described as being applied to the subsequent downlink transmission(s) 750, in some cases, one or more uplink beamforming parameters may be modified for an associated uplink transmission beam for transmitting an uplink transmission from the UE 115-b to the base station 105-b. In some cases, beam reciprocity may be used to determine the uplink beamforming parameters. In other cases, a separate beam switch command may be transmitted for switching an uplink transmission beam, which may be identified and decoded in a similar manner as discussed above.

Figure 8:
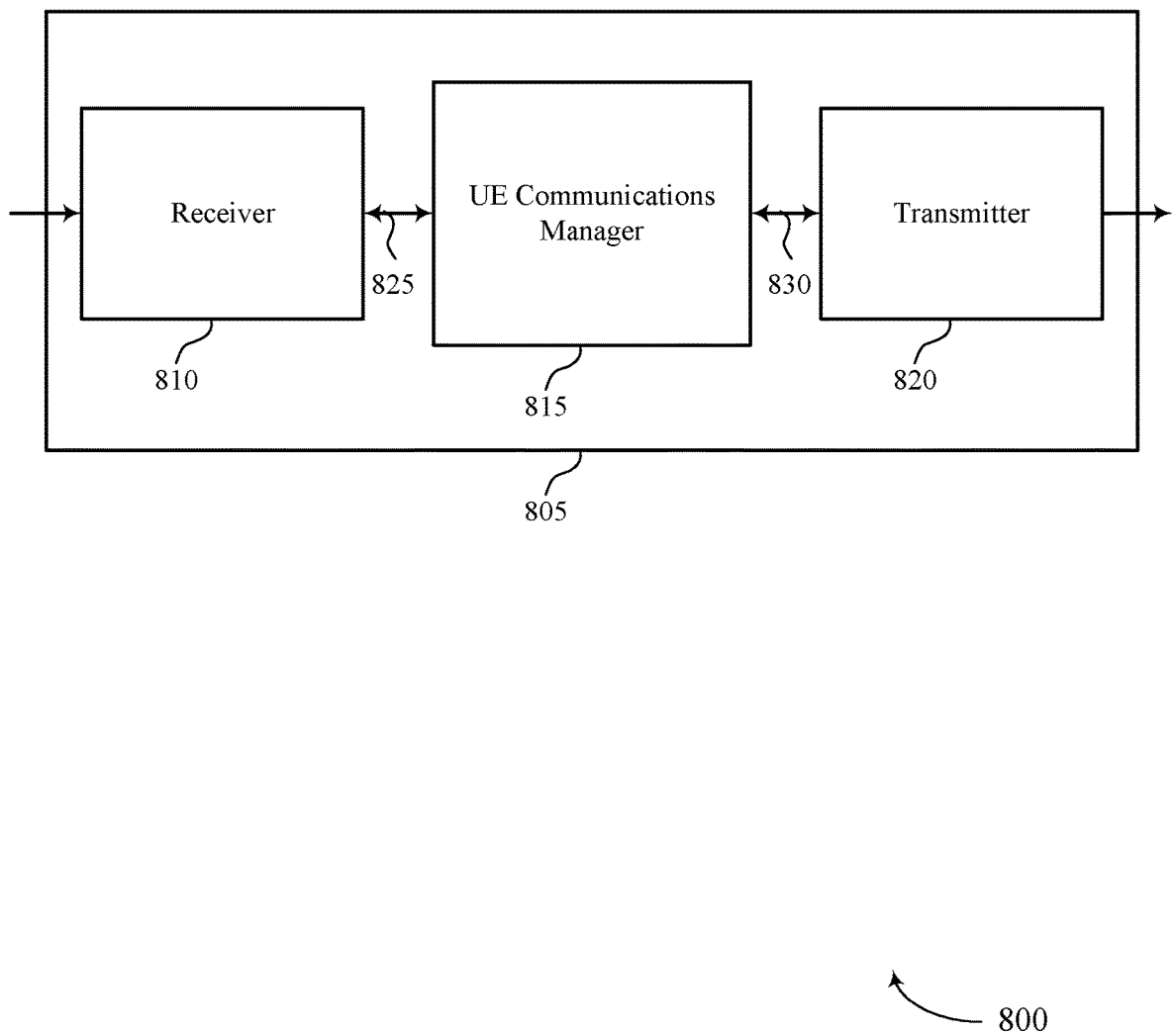
FIGS. 8 through 10 show block diagrams of a device that supports transmission of beam switch commands through control channel signaling in accordance with aspects of the present disclosure.

FIG. 8 shows a block diagram 800 of a wireless device 805 that supports transmission of beam switch commands through control channel signaling in accordance with aspects of the present disclosure. Wireless device 805 may be an example of aspects of a user equipment (UE) 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may monitor a control channel for a downlink transmission, and receive information such as packets, user data, or control information associated with various information channels (e.g., control channels, data channels, and information related to transmission of beam switch commands through control channel signaling, etc.). Receiver 810 may receive one or more downlink transmissions via different transmission beams based on one or more beamforming parameters, which may be switched in accordance with techniques provided herein. The received information may be passed on to other components of the device 805. The receiver 810 may transmit at least the received information 825 to UE communications manager 815 via an electrical connection (e.g., a wire or a bus). The receiver 810 may be an example of aspects of the transceiver 1135 described with reference to FIG. 11. The receiver 810 may utilize a single antenna or a set of antennas, which collect the information from a transmitting device (e.g., a base station 105).

UE communications manager 815 may receive the information transmitted from receiver 810, and perform various functions described herein. UE communications manager 815 may be an example of aspects of the UE communications manager 1115 described with reference to FIG. 11.

UE communications manager 815 may receive the information 825 from the receiver 810 via an electrical connection, and based at least in part on the information 825, UE communications manager 815 may establish a connection with the base station 105 using a first transmission beam, receive configuration information configuring the UE to select between a first decoding hypothesis corresponding to DCI including a bit field comprising a beam switch command and a second decoding hypothesis corresponding to the DCI not including the bit field, receive a downlink control channel transmission via the first transmission beam, decode the downlink control channel transmission in accordance with the configuration information to obtain decoded DCI, and communicate with the base station 105 based at least in part on the decoded DCI.

UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some examples, UE communications manager 815 may establish a connection with a base station using a first transmission beam, receive a downlink control channel transmission via the first transmission beam including downlink control information (DCI) in a DCI format, the DCI format including one or more bit fields including a beam switch command to switch from the first transmission beam to a second transmission beam, and modify one or more beamforming parameters based on the beam switch command.

Transmitter 820 may receive signals generated by other components of the device 805, and transmit at least the received signals to other components of the device 805, or a base station 105. In some example, transmitter 820 may receive a signal including at least one or more beamforming parameters 830 modified based on a beam switch command via an electrical connection. Transmitter 820 may then transmit uplink transmission based on the modified one or more beamforming parameters. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
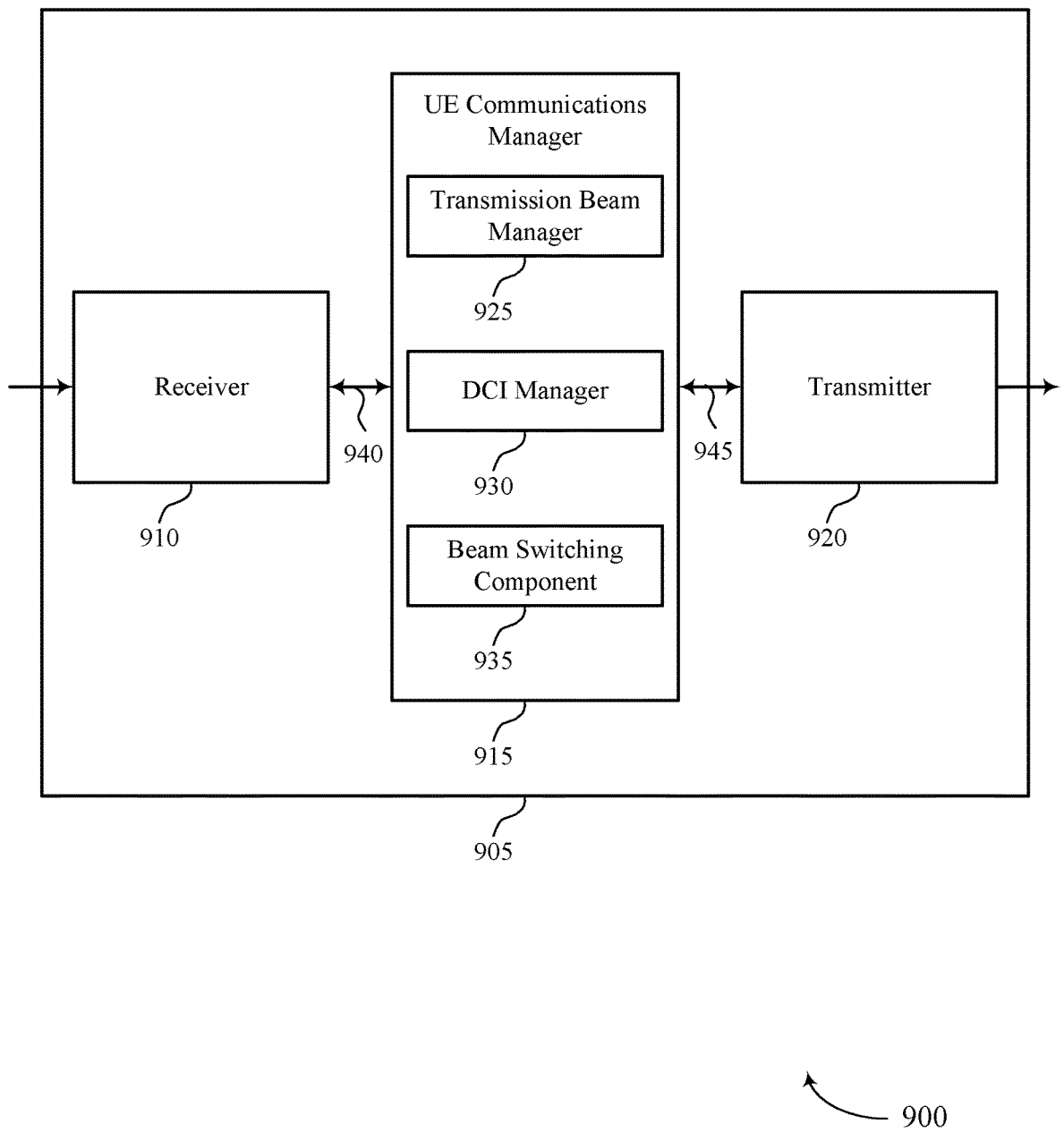

FIG. 9 shows a block diagram 900 of a wireless device 905 that supports transmission of beam switch commands through control channel signaling in accordance with aspects of the present disclosure. Wireless device 905 may be an example of aspects of a wireless device 805 or a UE 115 as described with reference to FIG. 8. Wireless device 905 may include receiver 910, UE communications manager 915, and transmitter 920. Wireless device 905 may also include a processor. Each of these components may be in communication with one another (e.g., via one or more buses).

Receiver 910 may monitor a control channel for a downlink transmission, and receive information such as packets, user data, or control information associated with various information channels (e.g., control channels, data channels, and information related to transmission of beam switch commands through control channel signaling, etc.) from a base station 105. For example, receiver 910 may monitor multiple sets of control resources configured for the UE 115 according to decoding hypotheses configured per set of control resources. The received information may be passed on to other components of the device 905. Receiver 910 may transmit at least the received information 940 to UE communications manager 915 or one or more of components of UE communications manager 915 via an electrical connection (e.g., a wire or a bus). The receiver 910 may be an example of aspects of the transceiver 1135 described with reference to FIG. 11. The receiver 910 may utilize a single antenna or a set of antennas.

UE communications manager 915 may receive the information 940 transmitted from the receiver 910 via the electrical connection, and may direct the received information to one or more components of UE communications manager 915. Based at least in part on the information transmitted from the receiver 910, UE communications manager 915 may establish a connection with the base station 105 using a first transmission beam, receive configuration information configuring the UE to select between a first decoding hypothesis corresponding to DCI including a bit field comprising a beam switch command and a second decoding hypothesis corresponding to the DCI not including the bit field, receive a downlink control channel transmission via the first transmission beam, decode the downlink control channel transmission in accordance with the configuration information to obtain decoded DCI, and communicate with the base station based at least in part on the decoded DCI. In some cases, UE communications manager 915 may transmit one or more beamforming parameters 945 to transmitter 920 via an electrical connection.

UE communications manager 915 may be an example of aspects of the UE communications manager 1115 described with reference to FIG. 11. UE communications manager 915 may also include transmission beam manager 925, DCI manager 930, and beam switching component 935. Each of these modules may communicate directly or indirectly with one another (e.g., via one or more buses).

Transmission beam manager 925 may receive the information transmitted from the receiver 910, and may establish a connection with the base station 105 using a first transmission beam. The connection may be established according to known connection establishment techniques. In some cases the first transmission beam may be established following a beam sweep procedure, a beam refinement procedure, or both. The first transmission beam may be established using a first set of beamforming parameters for a directional first transmission beam in a first direction.

DCI manager 930 may receive configuration information configuring the UE to select between a first decoding hypothesis corresponding to DCI including a bit field comprising a beam switch command and a second decoding hypothesis corresponding to the DCI not including the bit field, and receive a downlink control channel transmission via the first transmission beam from the receiver 910 or transmission beam manager 925. In some cases, the configuration information may include information that multiple sets of control resources are configured for the UE 115. In some examples, the configuration information may configure the UE 115 to select the first decoding hypothesis in a first set of control resources and the second decoding hypothesis in a second set of control resources that is different from the first set of control resources. The first decoding hypothesis may correspond to a first set of control resources and the second decoding hypothesis may correspond to a second set of control resources. As such, DCI manager 930 may decode the first set of control resources using the first decoding hypothesis or decode the second set of control resources using the second decoding hypothesis. DCI manager 930 may then decode the downlink control channel transmission in accordance with the configuration information to obtain decoded DCI. DCI manager 930 may then transmit the decoded DCI to transmission beam manager 925 via a bus (not shown). In some cases, DCI manager 930 may identify the beam switch command based at least in part on the decoded DCI, and transmit the beam switch command to beam switching component 935 via a bus (not shown).

In some cases, the downlink control channel transmission may include DCI in a DCI format, where the DCI format includes one or more bit fields including a beam switch command to switch from the first transmission beam to a second transmission beam. In some cases, the DCI manager 930 may identify the DCI format and the one or more bit fields including the beam switch command based on a successful blind decoding operation, decode the DCI according to the identified DCI format. In some cases, the DCI manager 930 may identify that a subset of one or more bit fields of a first DCI format includes the beam switch command, and may decode the beam switch command based on such an identification.

In some cases, the identifying is based on one of more of a configuration of the first DCI format, a transmission rank indicator, or an indication provided in radio resource control (RRC) signaling. In some cases, a reserved bit field is appended to one or more other bit fields of the DCI format. In some cases, DCI manager 930 may receive configuration information that includes a first subset of DCI formats that include the one or more bit fields including the beam switch command, and a second subset of DCI formats in which the one or more bit fields including the beam switch command are absent. In some cases, the DCI manager 930 decode a first portion of the DCI, the first portion including an activation bit that indicates that a beam switch DCI field is appended to the DCI, and decode the beam switch DCI field based on a state of the activation bit. DCI manager 930 may transmit to beam switching component 935, information including at least the identified DCI format, one or more bit fields including the beam switch command, or decoded beam switch DCI field.

Beam switching component 935 may receive the beam switch command transmitted from DCI manager 930, and modify one or more beamforming parameters based on the beam switch command. In some cases, the beam switching component 935 may identify one or more beamforming parameters based on the beam switch command. In some cases, the beam switch command includes one or more of a beam index or a beam tag that is mapped to the one or more beamforming parameters, and timing information indicating when the second transmission beam is to be used. Beam switching component 935 may transmit information including at least the modified one or more beamforming parameters 945 based on the beam switch command to transmitter 920 via an electrical connection (e.g., a wire or a bus).

Transmitter 920 may receive signals generated by other components of the device 905 via one or more electrical connections, and transmit the received signals to other components of the device 905, or the base station 105. In some cases, transmitter 920 may receive one or more beamforming parameters 945 modified based on the beam switch command from beam switching component 935 via an electrical connection. Transmitter 920 may then transmit uplink transmission based at least in part on the modified one or more beamforming parameters to the base station 105. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
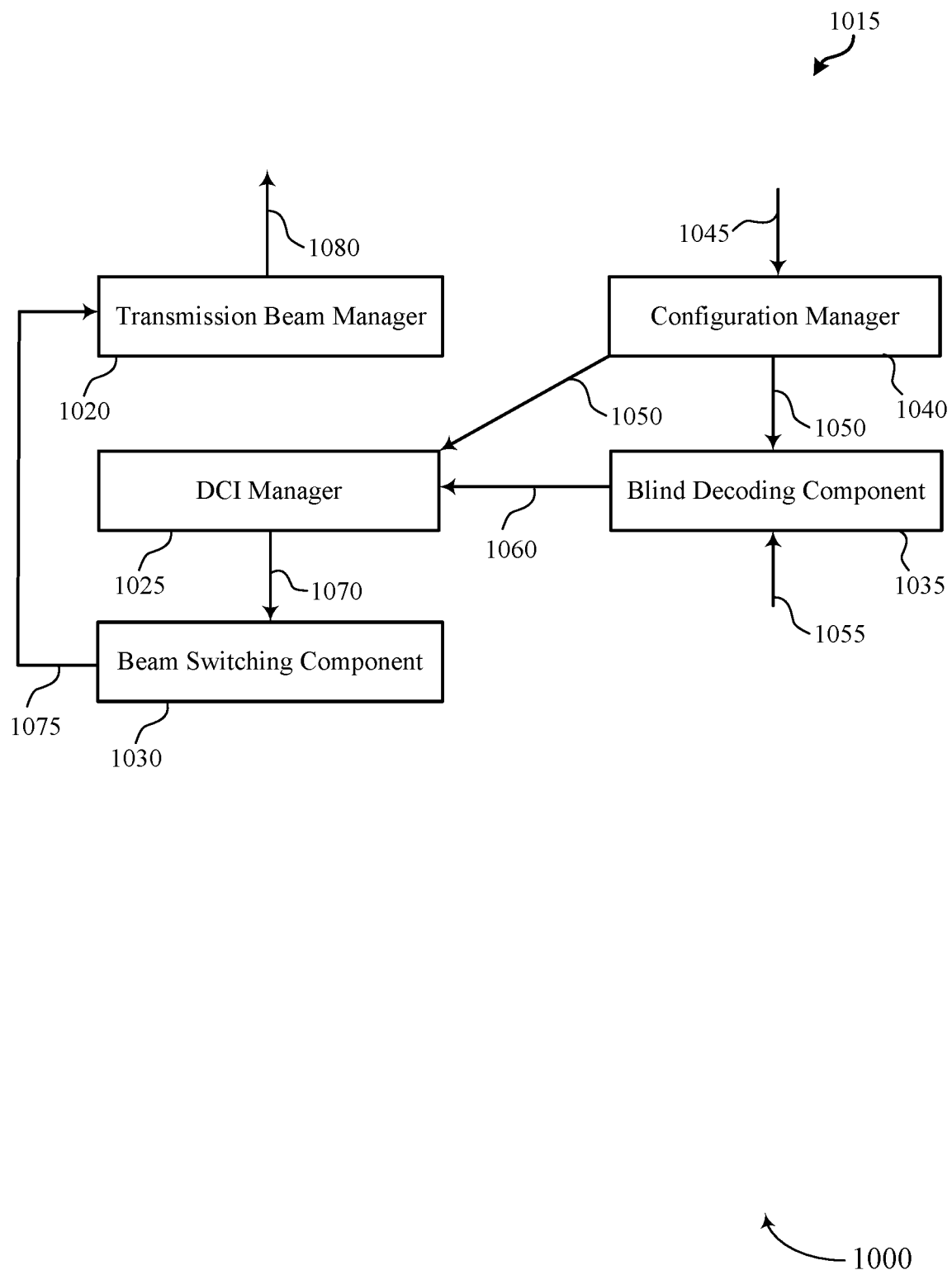

FIG. 10 shows a block diagram 1000 of UE communications manager 1015 that supports transmission of beam switch commands through control channel signaling in accordance with aspects of the present disclosure. UE communications manager 1015 may be an example of aspects of UE communications manager 815, UE communications manager 915, or UE communications manager 1115 described with reference to FIGS. 8, 9, and 11.

UE communications manager 1015 may receive information from a receiver (e.g., receiver 810, receiver 910, or transceiver 1135 in FIGS. 8, 9, and 11, respectively), and may direct the received information to one or more components of UE communications manager 1015. Based at least in part on the information, UE communications manager 915 may establish a connection with the base station 105 using a first transmission beam, receive configuration information configuring the UE to select between a first decoding hypothesis corresponding to DCI including a bit field comprising a beam switch command and a second decoding hypothesis corresponding to the DCI not including the bit field, receive a downlink control channel transmission via the first transmission beam, decode the downlink control channel transmission in accordance with the configuration information to obtain decoded DCI, and communicate with the base station based at least in part on the decoded DCI.

UE communications manager 1015 may include transmission beam manager 1020, DCI manager 1025, beam switching component 1030, blind decoding component 1035, and configuration manager 1040. Each of these modules may communicate, directly or indirectly, with one another (e.g., via one or more buses).

Transmission beam manager 1020 may control receiver 810, 910, or 1135 to establish a connection with base station 105 using a first transmission beam. The connection may be established according to known connection establishment techniques. In some cases, the first transmission beam may be established following a beam sweep procedure, a beam refinement procedure, or both. The first transmission beam may be established using a first set of beamforming parameters for a directional first transmission beam in a first direction. Transmission beam manager 1020 may control operation of receiver 810, 910, or 1135 for receiving signals from base station 105 via the established connection using the first transmission beam in accordance with a set of beamforming parameters.

Configuration manager 1040 may receive, via receiver 810, 910, or 1135, signaling 1045 that includes an RRC message or a DCI message, and obtain configuration information 1050 from the signaling 1045. Configuration manager 1040 may configure the blind decoding component 1035 for decoding DCI in accordance with the configuration information 1050. In some cases, configuration manager 1040 may pass to blind decoding component 1035, via an electrical connection, configuration information 1050 that includes a set of one or more decoding hypotheses, a set of one or more DCI formats, a subset of a set of DCI formats, which decoding hypothesis to use for a given DCI format or set of DCI formats, or the like. For example, configuration manager 1040 may use the configuration information 1050 to configure the blind decoding component 1035 to select between a first decoding hypothesis corresponding to DCI including a bit field comprising a beam switch command and a second decoding hypothesis corresponding to the DCI not including the bit field. In some cases, configuration information 1050 may indicate a set of DCI formats available to be used for decoding a downlink control channel transmission by the blind decoding component 1035. In some cases, configuration information 1050 may indicate that a subset of DCI formats is to be used as a blind decoding hypothesis set for blind decoding operations. In some cases, configuration information 1050 may identify a first subset of DCI formats and a second subset of DCI formats, and that one or both of the first subset of DCI formats and the second subset of DCI formats are to be used as a blind decoding hypothesis set for blind decoding operations.

Blind decoding component 1035 may also receive, via receiver 810, 910, or 1135, a downlink control channel transmission 1055 and decode the downlink control channel transmission 1055 in accordance with the configuration information 1050 received from the configuration manager 1040 to obtain decoded DCI 1060. In some cases, blind decoding component 1035 may perform one or more blind decoding operations based on a set of DCI formats indicated in the configuration information 1050. In some cases, the downlink control channel transmission 1055 may include DCI in a DCI format, where the DCI format includes one or more bit fields including a beam switch command to switch from the first transmission beam to a second transmission beam. In some cases, a reserved bit field may be identified based on blind decoding the DCI according to a first hypothesis that the reserved field is absent from the DCI, blind decoding the DCI according to a second hypothesis that the reserved field is present in the DCI, or both if blind decoding component 1035 is unsuccessful in decoding the DCI using an initial blind decoding hypothesis. Blind decoding component 1035 may then pass the decoded DCI 1060 to DCI manager 1025 via an electrical connection.

DCI manager 1025 may receive and process the decoded DCI 1060. DCI manager 1025 may identify the DCI format and the one or more bit fields including the beam switch command based on a successful blind decoding operation. In some cases, the DCI manager 1025 may identify that a subset of one or more bit fields of a first DCI format include the beam switch command. In some cases, the identifying is based on configuration information 1050 received from configuration manager 1040. In some cases, DCI manager 1025 may identify the one or more bit fields based at least in part on one or more of a configuration of a DCI format, a transmission rank indicator, or an indication provided in radio resource control (RRC) signaling.

In some cases, a reserved bit field is appended to one or more other bit fields of the DCI format. In some cases, a first subset of DCI formats may include the one or more bit fields including the beam switch command, and a second subset of DCI formats in which the one or more bit fields including the beam switch command are absent. In some cases, the DCI manager 1025 may process a first portion of the decoded DCI 1060, the first portion including an activation bit that indicates that a beam switch DCI field is appended to the DCI, and then process the beam switch DCI field based on a state of the activation bit. DCI manager 1025 may pass information 1070 including a decoded beam switch command and/or a beam switch DCI field to beam switching component 1030 via an electrical connection (e.g., a wire or a bus).

Beam switching component 1030 may receive the information 1070 from DCI manager 1025, and modify one or more beamforming parameters based on the information 1070 (e.g., the decoded beam switch command). In some cases, the beam switching component 1030 may identify one or more beamforming parameters based on the beam switch command. In some cases, the beam switch command includes one or more of a beam index or a beam tag that is mapped to the one or more beamforming parameters, and timing information indicating when the second transmission beam is to be used. Beam switching component 1030 may pass the modified one or more beamforming parameters 1075 to the transmission beam manager 1020 via an electrical connection.

Transmission beam manager 1020 may receive the modified one or more beamforming parameters 1075 and then output instructions 1080 to receiver 810, 910, or 1135 that indicates the modified one or more beamforming parameters. The receiver 810, 910, or 1135 may receive subsequent downlink control and/or data channel transmissions from the base station 105 in accordance with the modified one or more beamforming parameters.

Figure 11:
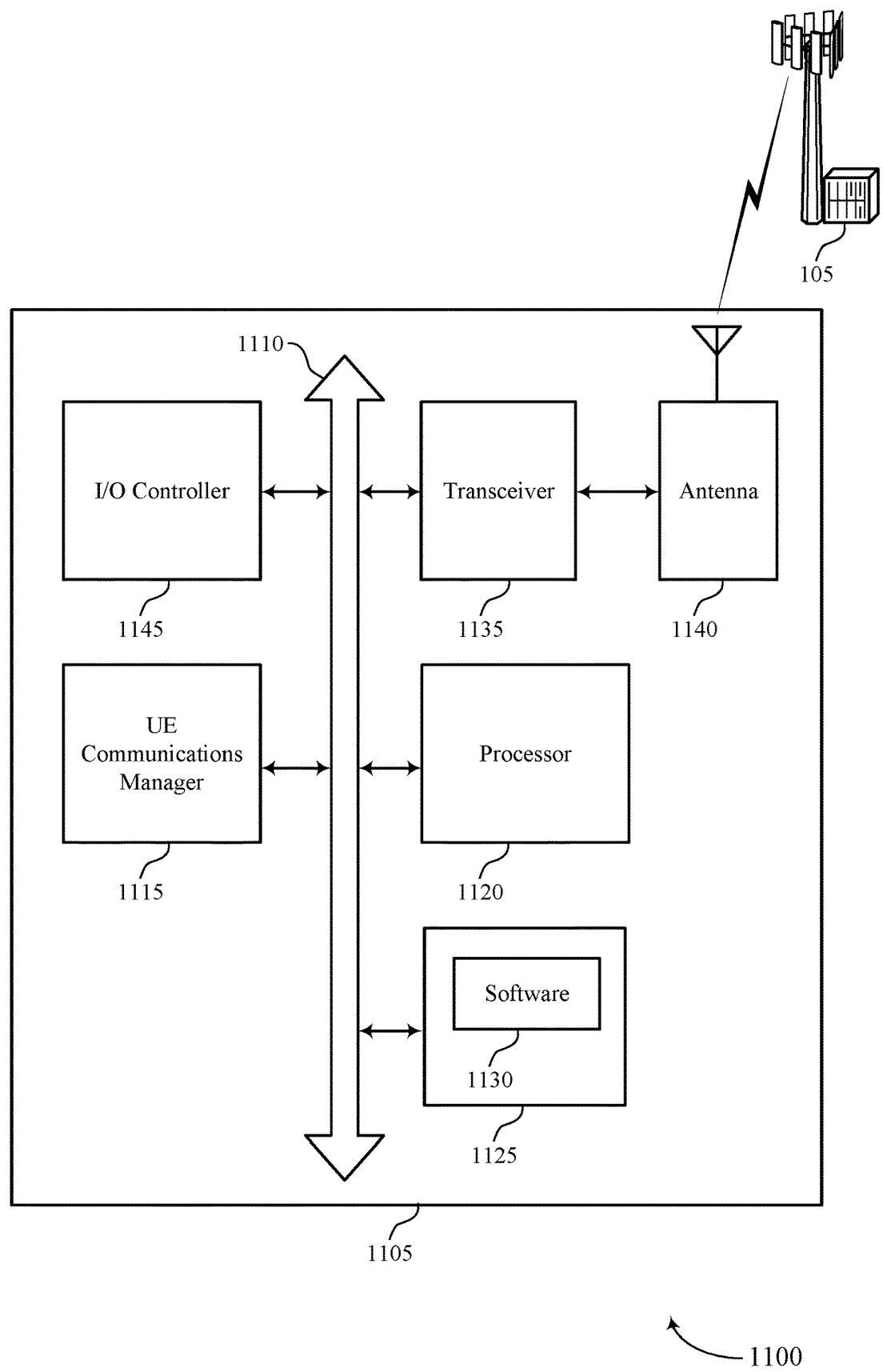
FIG. 11 illustrates a block diagram of a system including a UE that supports transmission of beam switch commands through control channel signaling in accordance with aspects of the present disclosure.

FIG. 11 shows a diagram of a system 1100 including a device 1105 that supports transmission of beam switch commands through control channel signaling in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

UE communications manager 1115 may establish a connection with the base station 105 using a first transmission beam, receive configuration information configuring the UE to select between a first decoding hypothesis corresponding to DCI including a bit field including a beam switch command and a second decoding hypothesis corresponding to the DCI not including the bit field, receive a downlink control channel transmission using the first transmission beam, decode the downlink control channel transmission in accordance with the configuration information to obtain decoded DCI, and communicate with the base station based at least in part on the decoded DCI.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be electrically coupled to memory 1125 via bus 1110, and configured to execute computer-readable instructions (e.g., software 1130) stored in a memory 1125 to cause the device 1105 to perform various functions. For example, processor 1120 may receive a downlink control channel transmission including a DCI in a DCI format from transceiver 1135 via bus 1110, and may cause UE communications manager 1115, electrically coupled to processor 1120 via bus 1110, to perform a beam switching operation based on a beam switch command, if any, included in the received downlink control channel transmission. In some cases, processor 1120 may be electrically coupled to I/O controller 1145 via an bus 1110, and cause I/O controller 1145 to manage input and output signals for device 1105.

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support transmission of beam switch commands through control channel signaling. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, transceiver 1135 may receive a downlink control channel transmission including a DCI in a DCI format from antenna 1140 via bus 1110, and transmit the received downlink control channel transmission to processor 1120, which in turn causes UE communications manager 1115 to decode the received DCI format.

In some cases, the wireless device 1105 may include a single antenna 1140. However, in some cases the device 1105 may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
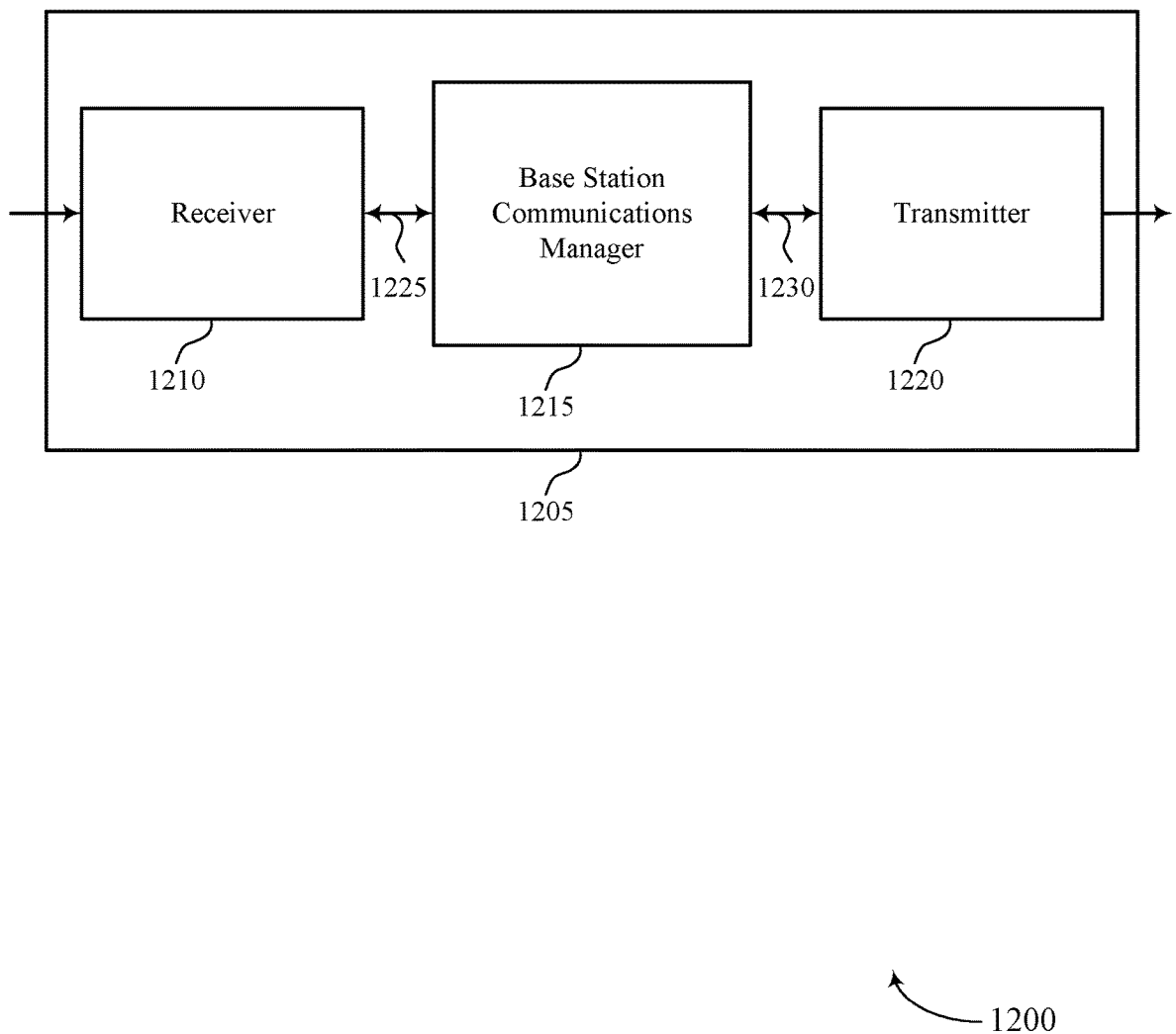
FIGS. 12 through 14 show block diagrams of a device that supports transmission of beam switch commands through control channel signaling in accordance with aspects of the present disclosure.

FIG. 12 shows a block diagram 1200 of a wireless device 1205 that supports transmission of beam switch commands through control channel signaling in accordance with aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may monitor a control channel for an uplink transmission, and receive information such as packets, user data, or control information associated with various information channels (e.g., control channels, data channels, and information related to transmission of beam switch commands through control channel signaling, etc.) from a UE 115. Information may be passed on to other components of the device 1205. Receiver 1210 may transmit the received information 1225 to base station communications manager 1215 or one or more of components of base station communications manager 1215 via an electrical connection (e.g., a wire or a bus). Receiver 1210 may be an example of aspects of the transceiver 1535 described with reference to FIG. 15. Receiver 1210 may utilize a single antenna or a set of antennas.

Base station communications manager 1215 may receive the information 1225 transmitted from the receiver 1210 via the electrical connection. Base station communications manager 1215 may establish a connection with a UE 115 using a first transmission beam, transmit configuration information to configure the UE 115 to select between a first decoding hypothesis corresponding to DCI including a bit field comprising a beam switch command and a second decoding hypothesis corresponding to the DCI not including the bit field, generate a downlink control channel transmission 1230 in accordance with the configuration information, and transmitter 1220 may transmit the downlink control channel transmission 1230 using the first transmission beam received from the base station communications manager 1215 via an electrical connection. Transmitter 1220 in turn transmits the downlink control channel transmission 1230 to the UE 115 using the first transmission beam. Base station communications manager 1215 may be an example of aspects of the base station communications manager 1515 described with reference to FIG. 15.

Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. Base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some cases, base station communications manager 1215 may establish a connection with a UE using a first transmission beam, determine that the UE is to be switched from the first transmission beam to a second transmission beam, and format a downlink control channel transmission including DCI in a DCI format, the DCI format including one or more bit fields including a beam switch command to switch from the first transmission beam to the second transmission beam.

Transmitter 1220 may receive and transmit signals generated by other components of the device 1205. In some cases, transmitter 1220 may receive the configuration information transmitted from base station communications manager 1215 for transmitting the configuration information to the UE 115 via the first transmission beam. The configuration may indicate that multiple sets of control resources are configured for the UE 115. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas. Transmitter 1220 may transmit the downlink control channel transmission to the UE via the first transmission beam.

Figure 13:
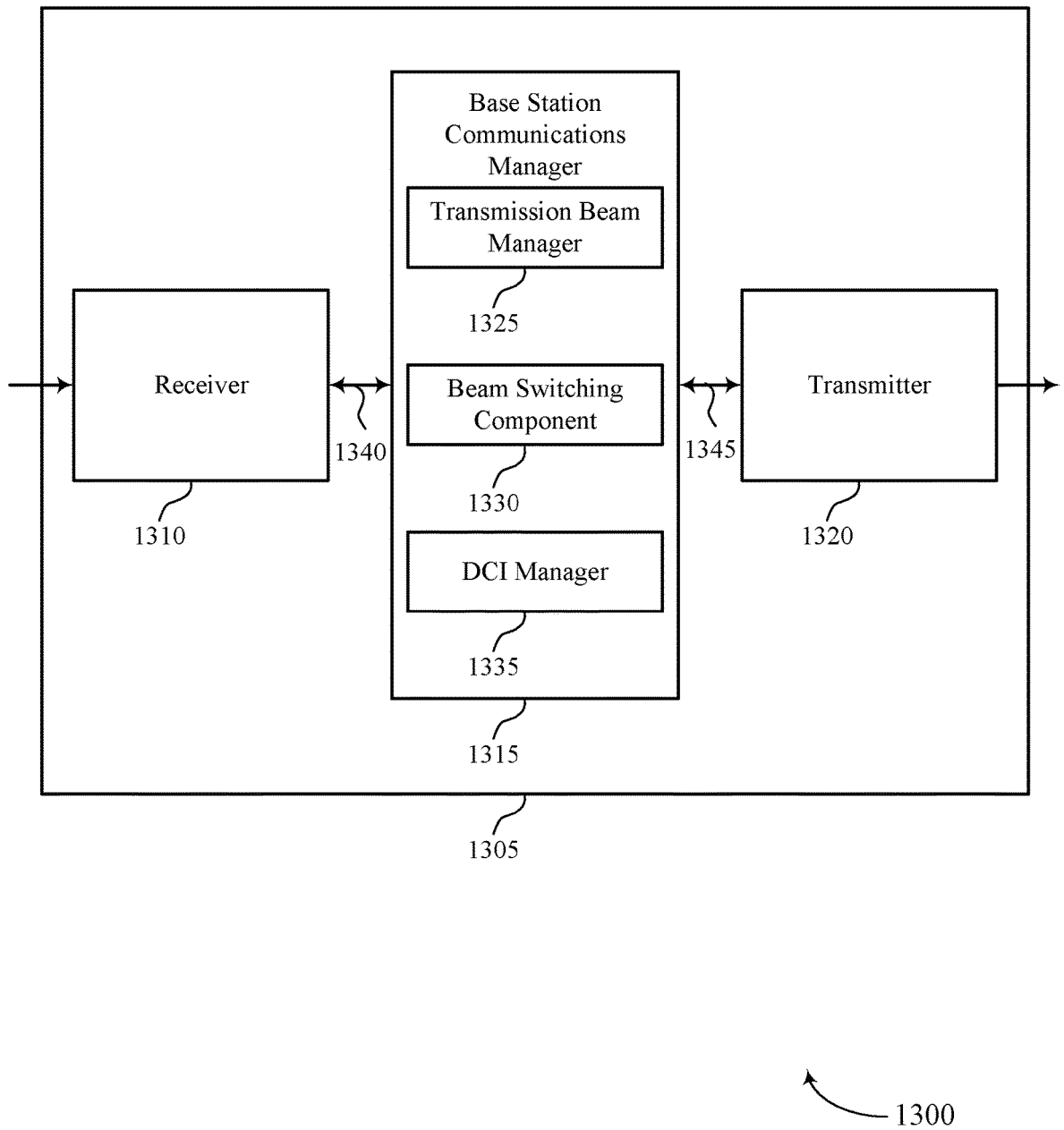

FIG. 13 shows a block diagram 1300 of a wireless device 1305 that supports transmission of beam switch commands through control channel signaling in accordance with aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may monitor a control channel for uplink transmission, and receive information such as packets, user data, or control information associated with various information channels (e.g., control channels, data channels, and information related to transmission of beam switch commands through control channel signaling, etc.). The received information 1340 may be passed on to other components of the device. Receiver 1310 may transmit at least the received information 1340 to base station communications manager 1315 via an electrical connection (e.g., a wire or a bus). Receiver 1310 may be an example of aspects of the transceiver 1535 described with reference to FIG. 15. Receiver 1310 may utilize a single antenna or a set of antennas.

Base station communications manager 1315 may receive the information 1340 transmitted from the receiver 1310 via the electrical connection, and may direct the received information to one or more components of base station communications manager 1315. Base station communications manager 1315 may establish a connection with a UE 115 using a first transmission beam, transmit configuration information to configure the UE 115 to select between a first decoding hypothesis corresponding to DCI including a bit field comprising a beam switch command and a second decoding hypothesis corresponding to the DCI not including the bit field, generate a downlink control channel transmission 1345 in accordance with the configuration information, and transmitter 1320 may receive the downlink control channel transmission 1345 via an electrical connection. Transmitter 1320 in turn transmits the downlink control channel transmission to the UE 115 using the first transmission beam. Base station communications manager 1315 may be an example of aspects of the base station communications manager 1515 described with reference to FIG. 15. Base station communications manager 1315 may also include transmission beam manager 1325, beam switching component 1330, and DCI manager 1335. Each of these components may be in communication with one another (e.g., via one or more buses).

Transmission beam manager 1325 may receive at least the information transmitted from receiver 1310, and may establish a connection with a UE 115 using a first transmission beam. The connection may be established according to known connection establishment techniques. In some cases, the first transmission beam may be established following a beam sweep procedure, a beam refinement procedure, or both. The first transmission beam may be established using a first set of beamforming parameters for a directional first transmission beam in a first direction. Transmission beam manager 1325 may transmit information including at least the established connection to one or more components of base station communications manager 1315 via a bus.

Beam switching component 1330 may determine that the UE 115 is to be switched from the first transmission beam to a second transmission beam based at least in part on the information transmitted from receiver 1310. In some cases, beam switching component 1330 may identify one or more of a beam index or a beam tag that are mapped to one or more beamforming parameters of the second transmission beam, and timing information indicating when the second transmission beam is to be used. This information may be included in a beam switch command. Beam switching component 1330 may pass at least the beam switch command to transmitter 1320 for transmitting the beam switch command to the UE 115 via the first transmission beam.

DCI manager 1335 may format the downlink control channel transmission including a DCI using a DCI format from a set of DCI formats available for the downlink control channel transmission, and transmit the downlink control channel transmission including the DCI to transmission beam manager 1325 or to transmitter 1320. In some cases, DCI manager 1335 may format a downlink control channel transmission including DCI in a DCI format based at least in part on the information transmitted from receiver 1310 or one or more signals received from other components of base station communications manager 1315 or the wireless device 1305. The DCI format may include one or more bit fields including a beam switch command to switch from the first transmission beam to the second transmission beam.

In some cases, the DCI manager 1335 may format a reserved bit field in the DCI format to include the beam switch command. In some cases, the reserved bit field is appended to one or more other bit fields of the DCI format. In some cases, the DCI manager 1335 may format the downlink control channel transmission by encoding a first portion of the DCI, the first portion including an activation bit that indicates that a beam switch DCI field is appended to the DCI, and encoding the beam switch DCI field based on a state of the activation bit. In some cases, the DCI manager 1335 may format the downlink control channel transmission by reusing one or more bit fields of the DCI format to indicate the beam switch command. DCI manager 1335 may transmit information including at least the formatted downlink control channel transmission including DCI to at least transmission beam manager 1325 via an electrical connection or transmitter 1320 for transmitting at least the information to one or more UEs 115.

Transmitter 1320 may receive and transmit signals generated by other components of the device 1305. In some cases, transmitter 1320 may receive the downlink control channel transmission from DCI manager 1335 for transmitting the downlink control channel transmission to the UE 115 via the first transmission beam. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
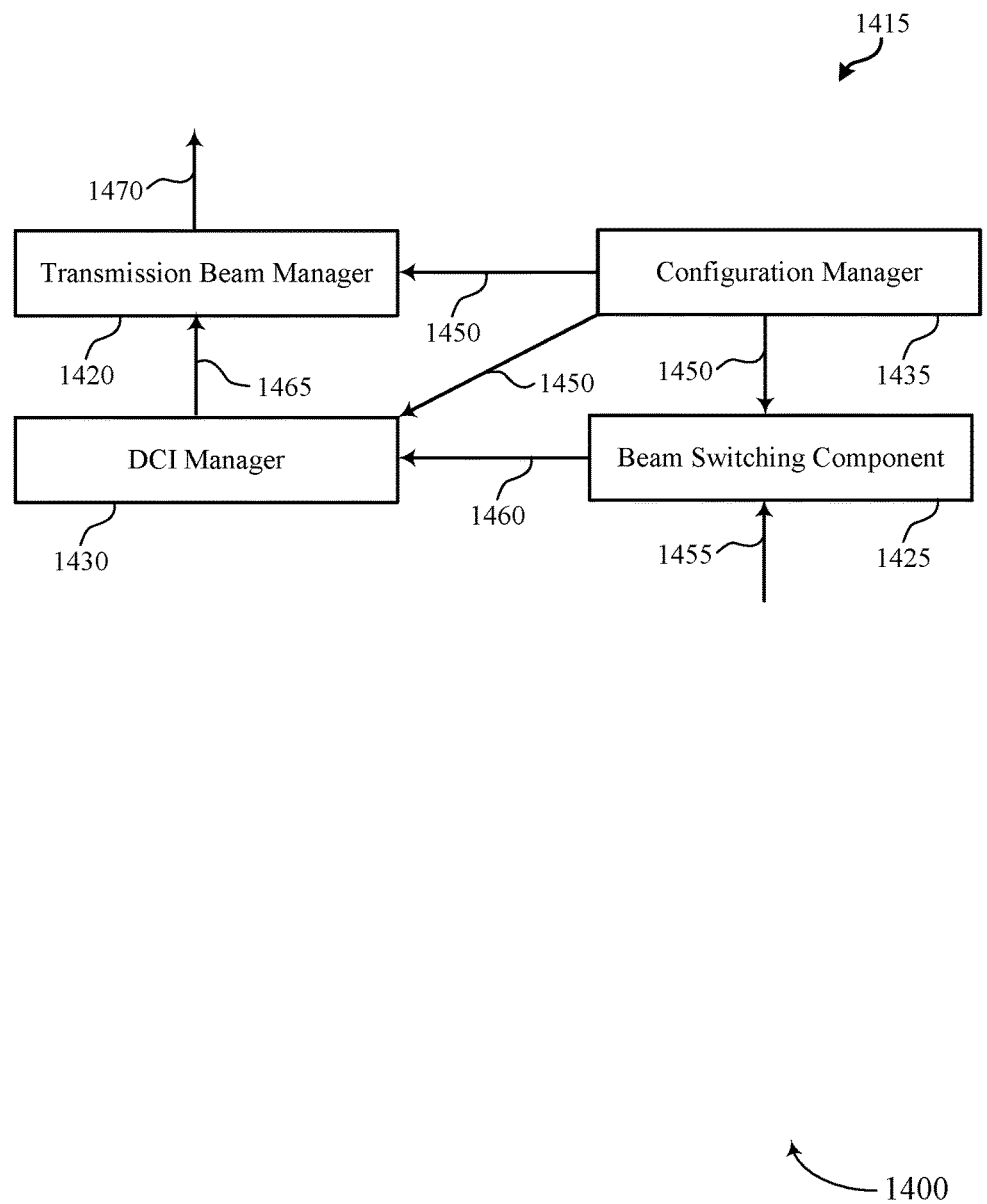

FIG. 14 shows a block diagram 1400 of a base station communications manager 1415 that supports transmission of beam switch commands through control channel signaling in accordance with aspects of the present disclosure. Base station communications manager 1415 may establish a connection with a UE 115 using a first transmission beam, transmit configuration information to configure the UE 115 to select between a first decoding hypothesis corresponding to DCI including a bit field comprising a beam switch command and a second decoding hypothesis corresponding to the DCI not including the bit field, generate a downlink control channel transmission in accordance with the configuration information, and transmit the downlink control channel transmission using the first transmission beam to the UE 115 via a transmitter (e.g., transmitter 1220, transmitter 1320 or transceiver 1535 described with reference to FIGS. 12, 13 and 15). Base station communications manager 1415 may be an example of aspects of base station communications manager 1215, 1315, and 1515 described with reference to FIGS. 12, 13, and 15. Base station communications manager 1415 may include transmission beam manager 1420, beam switching component 1425, DCI manager 1430, and configuration manager 1435. Each of these modules may communicate, directly or indirectly, with one another (e.g., via one or more buses).

Transmission beam manager 1420 may control transmitter 1220, 1320, or 1535 to establish a connection with a UE 115 using a first transmission beam. The connection may be established according to known connection establishment techniques. In some cases, the first transmission beam may be established following a beam sweep procedure, a beam refinement procedure, or both. The first transmission beam may be established using a first set of beamforming parameters for a directional first transmission beam in a first direction.

Configuration manager 1435 may generate configuration information 1450 for configuring the UE 115 to select between a first decoding hypothesis corresponding to downlink control information (DCI) including a bit field comprising a beam switch command and a second decoding hypothesis corresponding to the DCI not including the bit field. In some cases, configuration information 1450 may include that multiple sets of control resources are configured for the UE 115. In an example, the configuration information may configure the UE 115 to select the first decoding hypothesis in a first set of control resources and the second decoding hypothesis in a second set of control resources that is different from the first set of control resources. In such case, the first decoding hypothesis may correspond to a first set of control resources and the second decoding hypothesis may correspond to a second set of control resources. As such, the UE 115 may use the first decoding hypothesis to decode the first set of control resources or the second decoding hypothesis to decode the second set of control resources. In some cases, configuration information 1450 may indicate a set of DCI formats available for a downlink control channel transmission. In some cases, configuration information 1450 may include an indication that a subset of DCI formats is to be used as a blind decoding hypothesis set for a downlink control channel transmission, or that both a first subset of DCI formats and a second subset of DCI formats are to be used as the blind decoding hypothesis set for the downlink control channel transmission. In some cases, configuration information 1450 may include an indication that one or more bit fields are reused for a beam switch command. In some cases, configuration information 1450 may indicate one of more of a configuration of a DCI format, a transmission rank indication, or the like. In some cases, the set of DCI formats available for the downlink control channel transmission includes a first subset of DCI formats that include the one or more bit fields including the beam switch command, and a second subset of DCI formats in which the one or more bit fields including the beam switch command are absent.

In some cases, configuration manager 1435 may pass the configuration information 1450 to transmission beam manager 1420, to cause the transmitter 1220, 1320, or 1535 to transmit the configuration information 1450 to the UE 115 in RRC signaling. In some cases, configuration manager 1435 may transmit the configuration information 1450 to the DCI Manager 1430 for generating DCI corresponding to a blind decoding process to be performed at the UE 115.

Beam switching component 1425 may receive channel information 1455 (e.g., CQI) from UE 115 via the established connection using the first beam (e.g., via transceiver 1535). Beam switching component 1425 may determine that the UE 115 is to be switched from the first transmission beam to a second transmission beam based at least on the received channel information 1455. In some cases, beam switching component 1425 may identify one or more of a beam index or a beam tag that are mapped to one or more beamforming parameters of the second transmission beam, and timing information indicating when the second transmission beam is to be used. Some or all of this information may be included in a beam switch command 1460 for transmission to the UE 115 in DCI. Beam switching component 1425 may transmit information including at least the beam switch command 1460 to DCI manager 1430 via an electrical connection.

DCI manager 1430 may receive the configuration information 1450 from configuration manager 1435 and the beam switch command 1460 from the beam switching component 1425. In some cases, DCI manager 1430 may format a downlink control channel transmission including DCI in accordance with the configuration information 1450 and the beam switch command 1460. In some cases, DCI manager 1430 may format a downlink control channel transmission including DCI using a DCI format from a set of DCI formats available for the downlink control channel transmission, the set of DCI format configured in accordance with the configuration information 1450. In some cases, DCI manager 1430 may format a downlink control channel transmission including DCI in a DCI format, the DCI format including one or more bit fields including a beam switch command to switch from the first transmission beam to the second transmission beam.

In some cases, the DCI manager 1430 may format a reserved bit field in the DCI format to include a beam switch command. In some cases, the reserved bit field is appended to one or more other bit fields of the DCI format. In some cases, the DCI manager 1430 may format the downlink control channel transmission by encoding a first portion of the DCI, the first portion including an activation bit that indicates that a beam switch DCI field is appended to the DCI, and encoding the beam switch DCI field based on a state of the activation bit. In some cases, the DCI manager 1430 may format the downlink control channel transmission by reusing one or more bit fields of the DCI format to indicate the beam switch command. DCI manager 1430 may transmit information 1465 including at least the formatted downlink control channel transmission including DCI to transmission beam manager 1420 via an electrical connection for having the transmitter (e.g., transmitter 1220, 1320, and 1535 of FIGS. 12, 13, and 15) transmit the formatted downlink control channel transmission 1470 to one or more UEs 115 via the first or other transmission beam.

Figure 15:
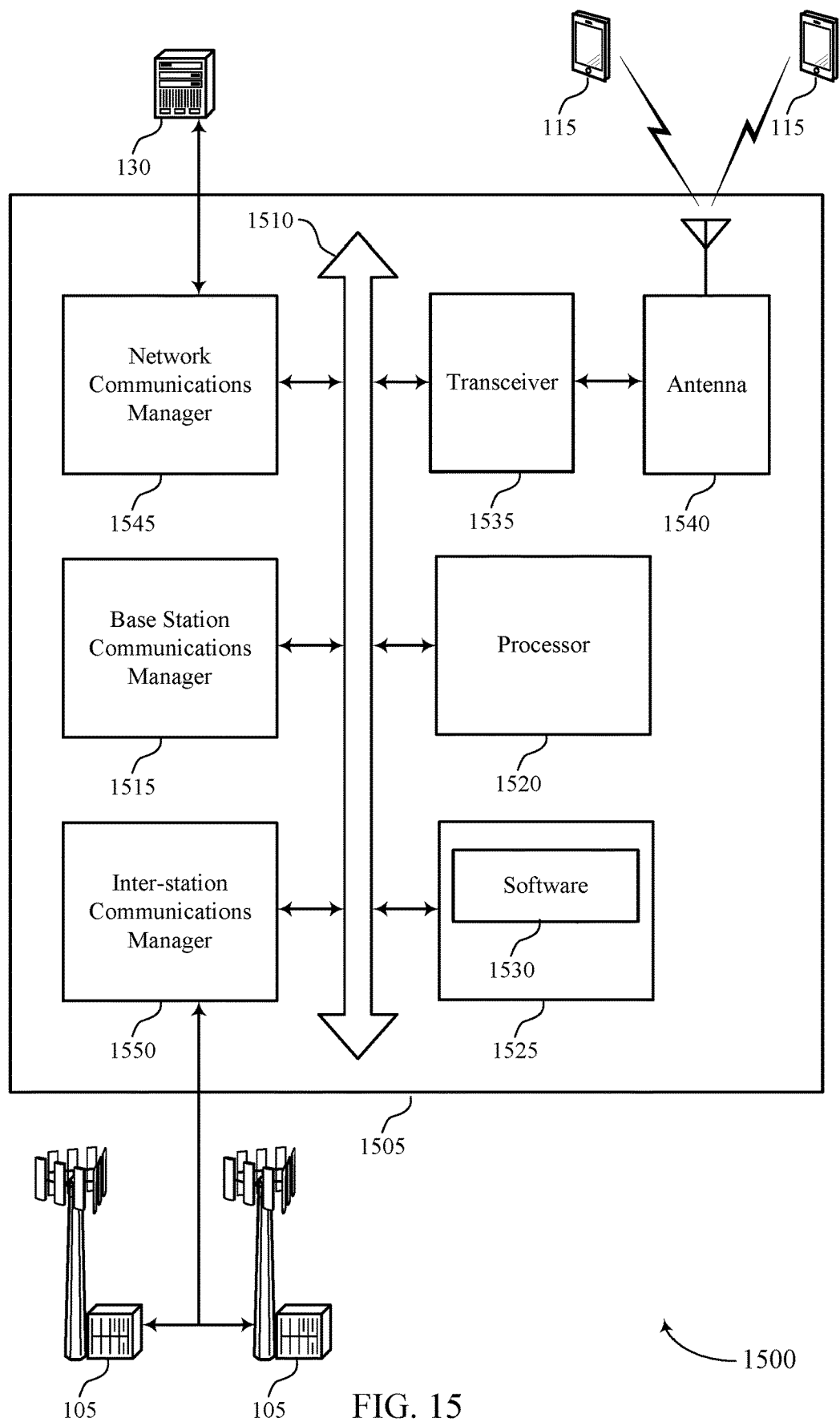
FIG. 15 illustrates a block diagram of a system including a base station that supports transmission of beam switch commands through control channel signaling in accordance with aspects of the present disclosure.

FIG. 15 shows a diagram of a system 1500 including a device 1505 that supports transmission of beam switch commands through control channel signaling in accordance with aspects of the present disclosure. Device 1505 may be an example of or include the components of base station 105 as described above, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via bus 1510.

Base station communications manager 1515 may establish a connection with a UE 115 using a first transmission beam, transmit configuration information to configure the UE 115 to select between a first decoding hypothesis corresponding to DCI including a bit field comprising a beam switch command and a second decoding hypothesis corresponding to the DCI not including the bit field, generate a downlink control channel transmission in accordance with the configuration information, and transmit the downlink control channel transmission to the UE 115 using the first transmission beam. In some cases, base station communications manager 1515 may transmit the downlink control channel transmission to transceiver 1535 via bus 1510, and transceiver 1535 may in turn transmit the downlink control channel transmission to antenna 1540 via bus 1510. Antenna 1540 may then transmit the downlink control channel transmission to the UE 115 using the first transmission beam.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory 1525, electrically coupled to processor 1520 via a bus 1510, to perform various functions (e.g., functions or tasks supporting transmission of beam switch commands through control channel signaling). In some cases, processor 1520 may execute the instructions based on the information (e.g., CQI) transmitted by transceiver 1535 via bus 1510. In some cases, processor 1520 may cause base station communications manager 1515, electrically coupled to processor 1520 via a bus 1510, to perform various functions described herein (e.g., formatting downlink control channel transmission including a DCI in a DCI format including a beam switch command). In some cases, processor 1520 may execute the instructions based on signals received from network communications manager 1545 via bus 1510 or inter-station communications manager 1550 via bus 1510 for managing communications with a core network 130 and one or more other base stations 105, respectively.

Memory 1525 may include RAM and ROM. The memory 1525 may store computer-readable, computer-executable software 1530 including instructions that, when executed, cause the processor 1520 to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support transmission of beam switch commands through control channel signaling. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas. In some cases, transceiver 1535 may transmit a downlink control channel transmission including a beam switch command to UE via antenna 1540.

In some cases, the wireless device 1505 may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an Long Term Evolution (LTE)/LTE-A wireless communication network technology to provide communication between base stations 105.

Figure 16:
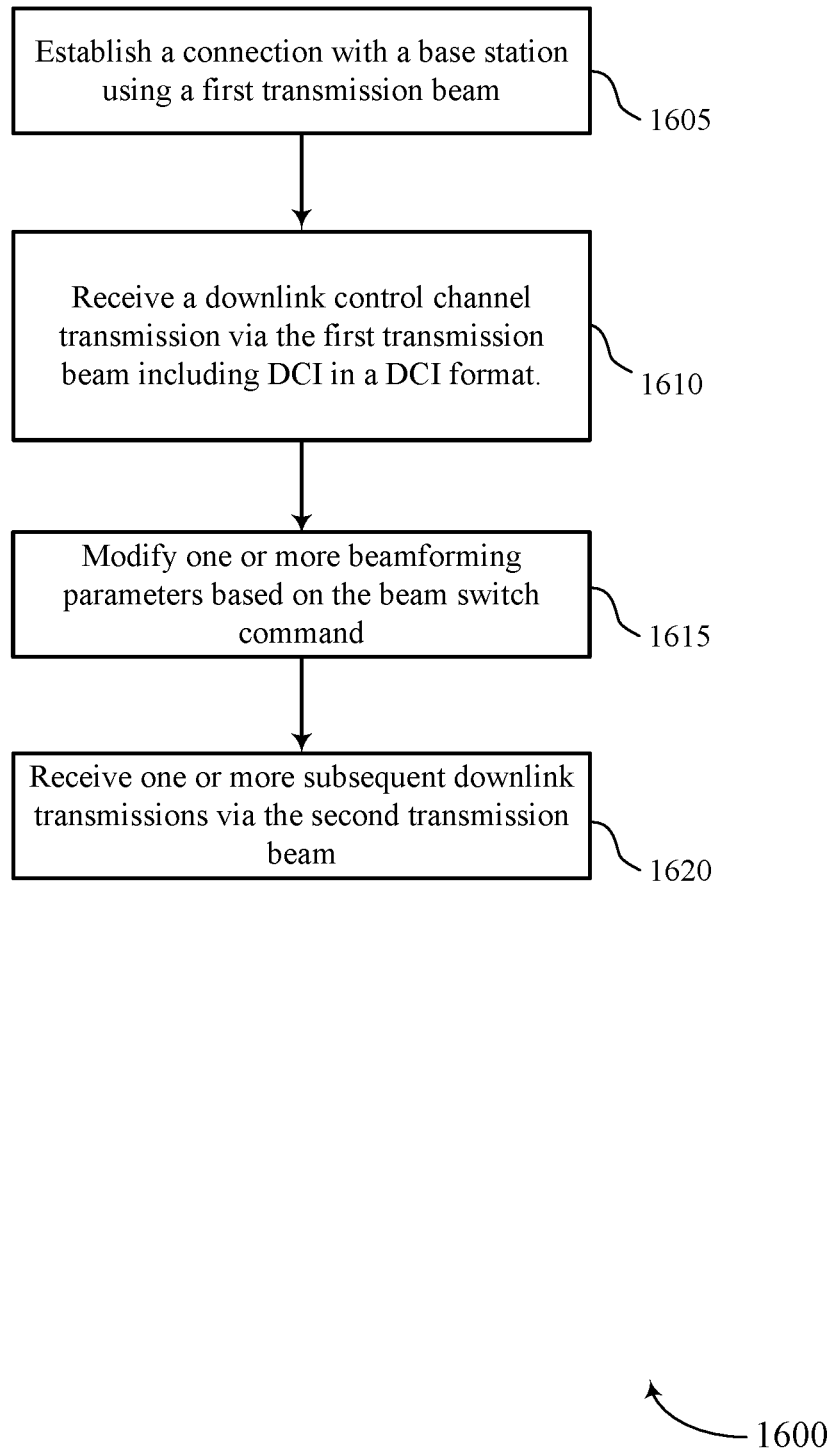
FIGS. 16 through 22 illustrate methods for transmission of beam switch commands through control channel signaling in accordance with aspects of the present disclosure.

FIG. 16 shows a flowchart illustrating a method 1600 for transmission of beam switch commands through control channel signaling in accordance with aspects of the present disclosure. The operations of method 1600 may be implemented by a UE 115 or its components as described herein. For example, the operations of method 1600 may be performed by a UE communications manager 815, 915, 1015, and 1115 as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1605, the UE 115 may establish a connection with a base station 105 using a first transmission beam. The operations of block 1605 may be performed according to the methods described herein. In some cases, the connection may be established following a beam sweep procedure, a beam refinement procedure, or both. In some cases, the first transmission may be established with a first set of beamforming parameters that provide the first transmission beam in a first direction. In certain examples, aspects of the operations of block 1605 may be performed by a transmission beam manager as described with reference to FIGS. 8 through 11.

At block 1610, the UE 115 may monitor a control channel for downlink transmission, and receive a downlink control channel transmission via the first transmission beam including downlink control information (DCI) in a DCI format. The DCI format may include one or more bit fields including a beam switch command to switch from the first transmission beam to a second transmission beam. The operations of block 1610 may be performed according to the methods described herein. In some cases, the DCI format may be identified using a blind decoding process in which one or more blind decoding hypotheses of a blind decoding hypothesis set are attempted. In some cases, the DCI may include a reserved bit field that includes the beam switch command, which is appended to one or more other DCI bit fields. In some cases, the DCI may include one or more re-used DCI bit fields to indicate the beam switch command. In certain examples, aspects of the operations of block 1610 may be performed by a DCI manager as described with reference to FIGS. 8 through 11.

At block 1615, the UE 115 may modify one or more beamforming parameters based at least in part on the beam switch command. The operations of block 1615 may be performed according to the methods described herein. In some cases, the one or more beamforming parameters may be modified based on the beam switch command. In some cases, the beam switch command may include a beam index or tag that indicates the modified beamforming parameters. The beam index or tag may be associated, in some examples, to a beam refinement signal that is associated with the modified one or more beamforming parameters. In some cases, the beam switch command may also include a time that indicates when the modified beamforming parameters are to be used. In certain examples, aspects of the operations of block 1615 may be performed by a beam switching component as described with reference to FIGS. 8 through 11.

At block 1620, the UE 115 may receive one or more subsequent downlink transmissions via the second transmission beam. The operations of block 1620 may be performed according to the methods described herein. In some cases, the one or more subsequent downlink transmissions may include one or more downlink transmissions that may include data of control information. In certain examples, aspects of the operations of block 1620 may be performed by a receiver as described with reference to FIGS. 8 through 11.

Figure 17:
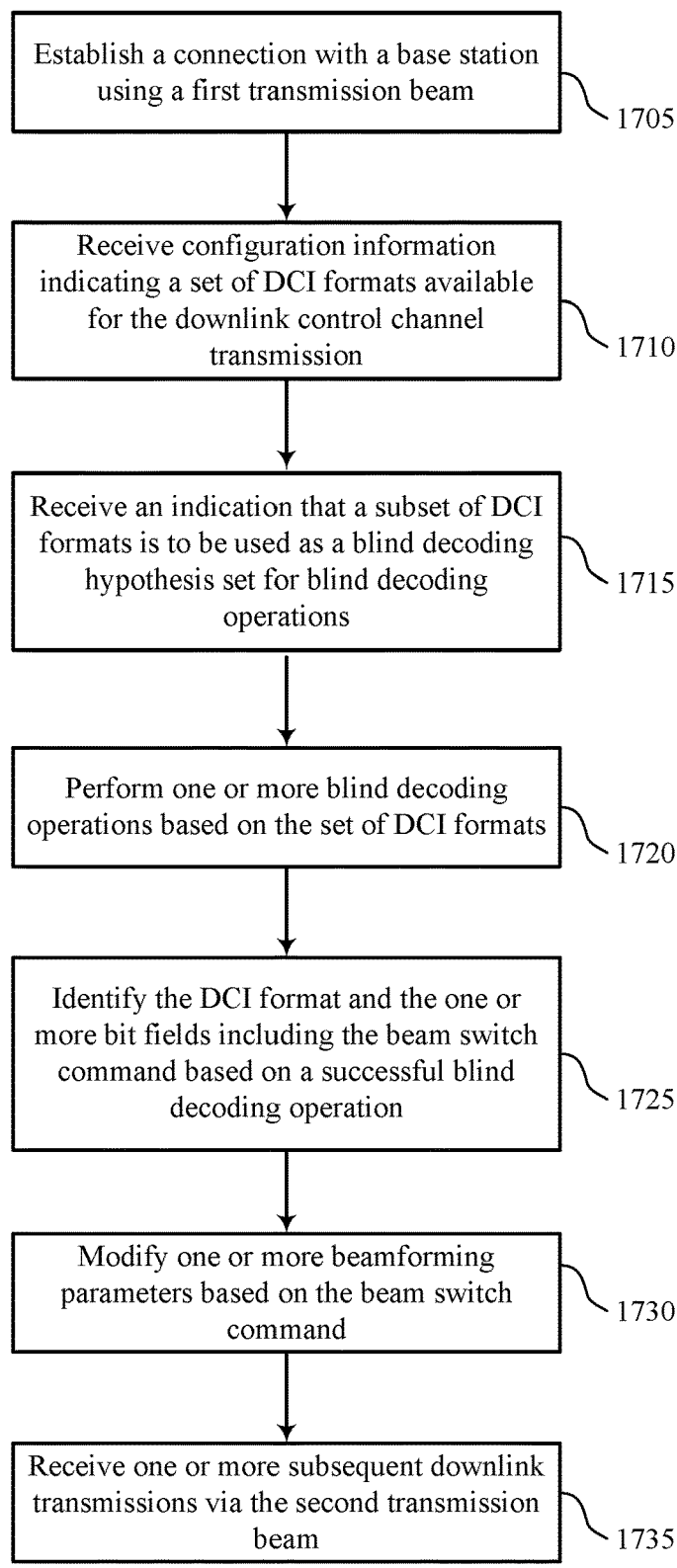

FIG. 17 shows a flowchart illustrating a method 1700 for transmission of beam switch commands through control channel signaling in accordance with aspects of the present disclosure. The operations of method 1700 may be implemented by a UE 115 or its components as described herein. For example, the operations of method 1700 may be performed by a UE communications manager 815, 915, 1015, and 1115 as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1705, the UE 115 may establish a connection with a base station 105 using a first transmission beam. The operations of block 1705 may be performed according to the methods described herein. In some cases, the connection may be established following a beam sweep procedure, a beam refinement procedure, or both. In some cases, the first transmission may be established with a first set of beamforming parameters that provide the first transmission beam in a first direction. In certain examples, aspects of the operations of block 1705 may be performed by a transmission beam manager as described with reference to FIGS. 8 through 11.

At block 1710, the UE 115 may receive configuration information indicating a set of DCI formats available for the downlink control channel transmission. The operations of block 1710 may be performed according to the methods described herein. In some cases, the configuration information may be received in higher layer signaling, such as RRC signaling, or in a MAC-CE transmitted from a base station. In some cases, the configuration information may indicate that certain subsets of DCI information are available for blind decoding operations. In certain examples, aspects of the operations of block 1710 may be performed by a configuration manager as described with reference to FIGS. 8 through 11.

At block 1715, the UE 115 may receive an indication that the second subset of DCI formats is to be used as a blind decoding hypothesis set for the blind decoding operations, or that both a first subset of DCI formats and a second subset of DCI formats are to be used as the blind decoding hypothesis set for the blind decoding operations. The operations of block 1715 may be performed according to the methods described herein. In some cases, the first subset of DCI formats may include DCI formats that do not include a beam switch command, and the second subset of DCI formats may include DCI formats that include the beam switch command in addition to DCI formats that do not include the beam switch command. The UE may limit the hypotheses used in blind decoding operations based on the indicated set of subset of DCI formats, in some cases. In certain examples, aspects of the operations of block 1715 may be performed by a configuration manager as described with reference to FIGS. 8 through 11.

At block 1720, the UE 115 may perform one or more blind decoding operations based at least in part on the set of DCI formats. The operations of block 1720 may be performed according to the methods described herein. In some cases, the UE 115 may attempt to blindly decode the DCI according to a first decoding hypothesis, and depending upon whether the decoding is successful, attempt decoding on one or more other blind decoding hypotheses. In certain examples, aspects of the operations of block 1720 may be performed by a blind decoding component as described with reference to FIGS. 8 through 11.

At block 1725, the UE 115 may identify the DCI format and the one or more bit fields comprising the beam switch command based at least in part on a successful blind decoding operation. The operations of block 1725 may be performed according to the methods described herein. In some cases, the identified DCI format may include one or more DCI fields and the beam switch command may be appended to the one or more DCI fields. In some cases, the beam switch command may be included in bits of a DCI field that are re-used for the beam switch command. In certain examples, aspects of the operations of block 1725 may be performed by a DCI manager as described with reference to FIGS. 8 through 11.

At block 1730, the UE 115 may modify one or more beamforming parameters based at least in part on the beam switch command. The operations of block 1730 may be performed according to the methods described herein. In some cases, the one or more beamforming parameters may be modified based on information in the beam switch command. Such information may include, for example, a beam index or tag that is associated with the modified beamforming parameters. In some cases, the beam index of tag may be associated with a beam refinement signal of one or more uplink or downlink transmissions. In certain examples, aspects of the operations of block 1730 may be performed by a beam switching component as described with reference to FIGS. 8 through 11.

At block 1735, the UE 115 may receive one or more subsequent downlink transmissions via the second transmission beam. The operations of block 1735 may be performed according to the methods described herein. In certain examples, aspects of the operations of block 1735 may be performed by a receiver as described with reference to FIGS. 8, 9 and 11.

Figure 18:
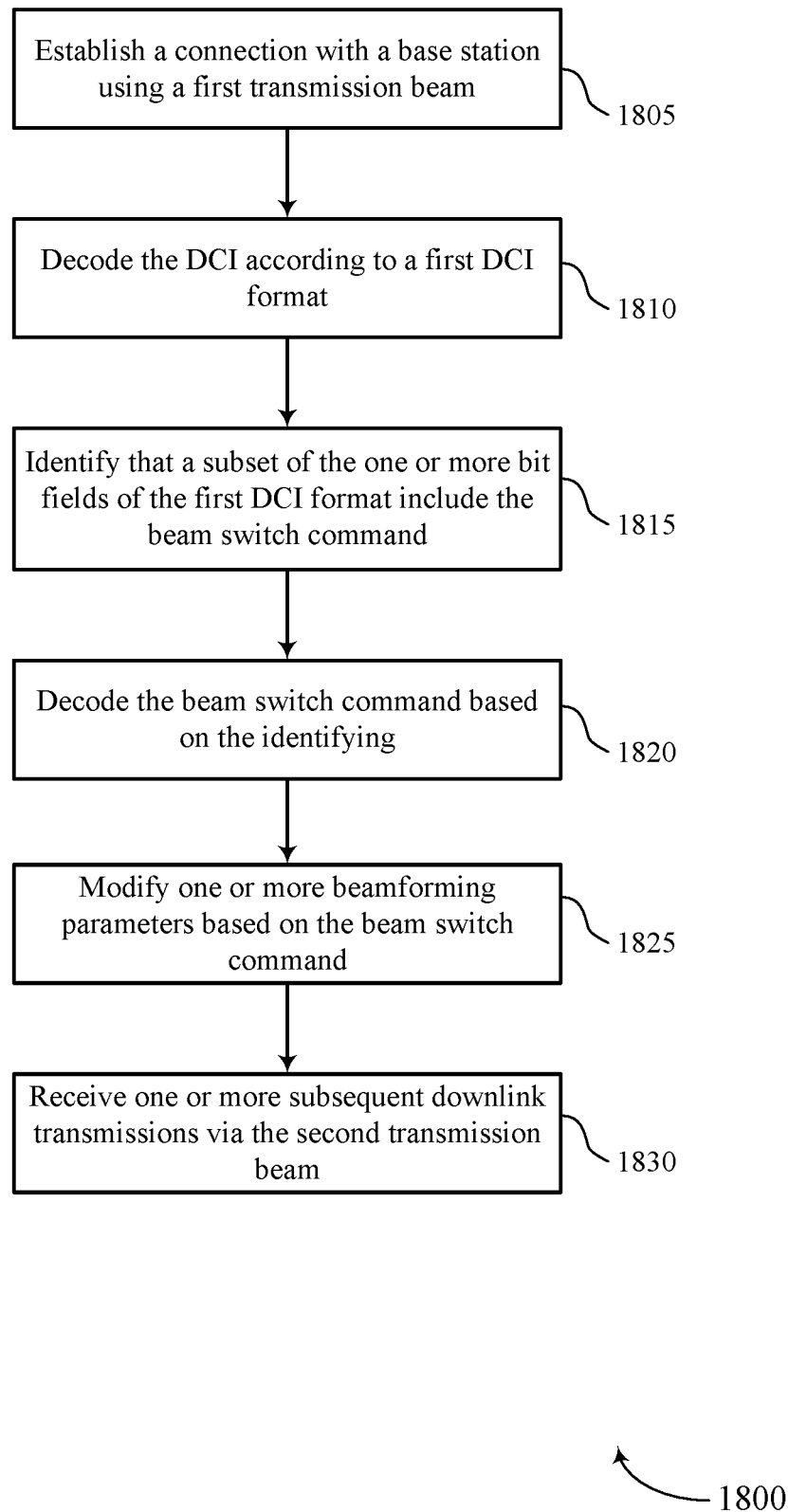

FIG. 18 shows a flowchart illustrating a method 1800 for transmission of beam switch commands through control channel signaling in accordance with aspects of the present disclosure. The operations of method 1800 may be implemented by a UE 115 or its components as described herein. For example, the operations of method 1800 may be performed by a UE communications manager 815, 915, 1015, and 1115 as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1805, the UE 115 may establish a connection with a base station 105 using a first transmission beam. The operations of block 1805 may be performed according to the methods described herein. In some cases, the connection may be established following a beam sweep procedure, a beam refinement procedure, or both. In some cases, the first transmission may be established with a first set of beamforming parameters that provide the first transmission beam in a first direction. In certain examples, aspects of the operations of block 1805 may be performed by a transmission beam manager as described with reference to FIGS. 8 through 11.

At block 1810, the UE 115 may decode the DCI according to a first DCI format. The operations of block 1810 may be performed according to the methods described herein. In some cases, the first DCI format may include two or more CWs that may include DCI, and in which the bits of one of the CWs may be reused for a beam switch command. In some cases, the first DCI format may include a beam switch field that is appended to one or more other DCI fields. In certain examples, aspects of the operations of block 1810 may be performed by a DCI manager as described with reference to FIGS. 8 through 11.

At block 1815, the UE 115 may identify that a subset of the one or more bit fields of the first DCI format include the beam switch command. The operations of block 1815 may be performed according to the methods described herein. In some cases, the subset of the one or more bit fields may be identified based on a format of the DCI information, and whether a bit field is reused or appended to other DCI bit fields. In some cases, In certain examples, aspects of the operations of block 1830 may be performed by a DCI manager as described with reference to FIGS. 8 through 11.

At block 1820, the UE 115 may decode the beam switch command based at least in part on the identifying. The operations of block 1820 may be performed according to the methods described herein. In some cases, the beam switch command may include an index of tag that identifies modified transmission beam parameters. In certain examples, aspects of the operations of block 1820 may be performed by a DCI manager as described with reference to FIGS. 8 through 11.

At block 1825, the UE 115 may modify one or more beamforming parameters based at least in part on the beam switch command. The operations of block 1825 may be performed according to the methods described herein. In some cases, the one or more beamforming parameters may be modified based on information in the beam switch command. Such information may include, for example, a beam index or tag that is associated with the modified beamforming parameters. In some cases, the beam index of tag may be associated with a beam refinement signal of one or more uplink or downlink transmissions. In certain examples, aspects of the operations of block 1825 may be performed by a beam switching component as described with reference to FIGS. 8 through 11.

At block 1830, the UE 115 may receive one or more subsequent downlink transmissions via the second transmission beam. The operations of block 1830 may be performed according to the methods described herein. In certain examples, aspects of the operations of block 1830 may be performed by a receiver as described with reference to FIGS. 8 through 11.

Figure 19:
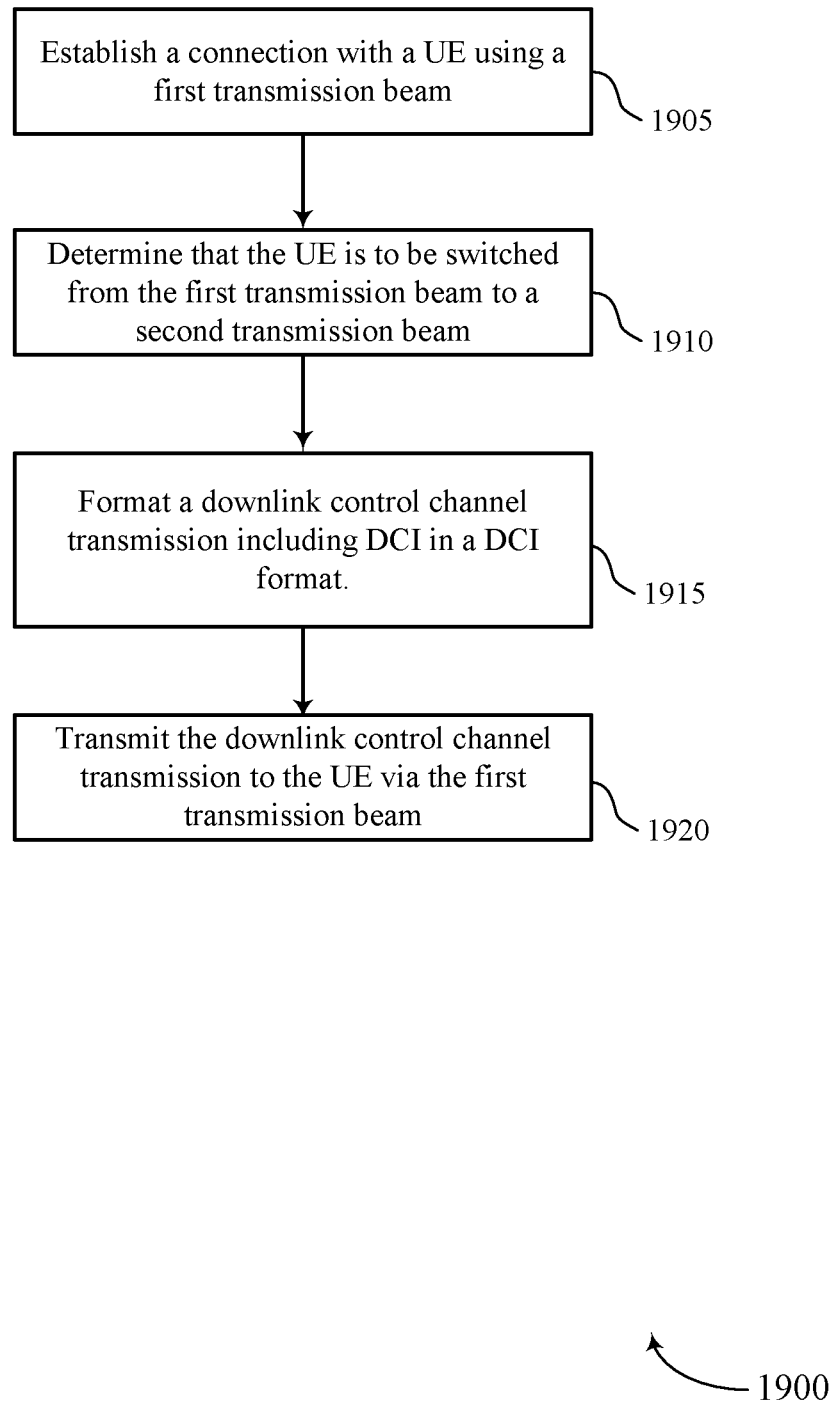

FIG. 19 shows a flowchart illustrating a method 1900 for transmission of beam switch commands through control channel signaling in accordance with aspects of the present disclosure. The operations of method 1900 may be implemented by a base station 105 or its components as described herein. For example, the operations of method 1900 may be performed by a base station communications manager 1215, 1315, 1415, and 1515 as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 1905, the base station 105 may establish a connection with a user equipment (UE) using a first transmission beam. The operations of block 1905 may be performed according to the methods described herein. In some cases, the connection may be established following a beam sweep procedure, a beam refinement procedure, or both. In some cases, the first transmission may be established with a first set of beamforming parameters that provide the first transmission beam in a first direction. In certain examples, aspects of the operations of block 1905 may be performed by a transmission beam manager as described with reference to FIGS. 12 through 15.

At block 1910, the base station 105 may determine that the UE 115 is to be switched from the first transmission beam to a second transmission beam. The operations of block 1910 may be performed according to the methods described herein. In some cases, the determination that the UE 115 is to be switched may be made based on one or more measurements of the first transmission beam. In some cases, the determination may be made based at least in part on a beam refinement signal. In certain examples, aspects of the operations of block 1910 may be performed by a beam switching component as described with reference to FIGS. 12 through 15.

At block 1915, the base station 105 may format a downlink control channel transmission including downlink control information (DCI) in a DCI format, the DCI format including one or more bit fields comprising a beam switch command to switch from the first transmission beam to the second transmission beam. The DCI format, in some examples, may include one or more bit fields that are appended to one or more other DCI bit fields. In some cases, the DCI format may include a bit field that is re-used to indicate a beam switch command. The operations of block 1915 may be performed according to the methods described herein. In certain examples, aspects of the operations of block 1915 may be performed by a DCI manager as described with reference to FIGS. 12 through 15.

At block 1920, the base station 105 may transmit the downlink control channel transmission to the UE 115 via the first transmission beam. The operations of block 1920 may be performed according to the methods described herein. In some cases, subsequent to the transmission of the downlink control channel transmission, one or more other downlink transmissions are transmitted using the second transmission beam. In some cases, one or more subsequent uplink transmissions may also be based at least in part on the beam switch command. In certain examples, aspects of the operations of block 1920 may be performed by a transmitter as described with reference to FIGS. 12, 13 and 15.

Figure 20:
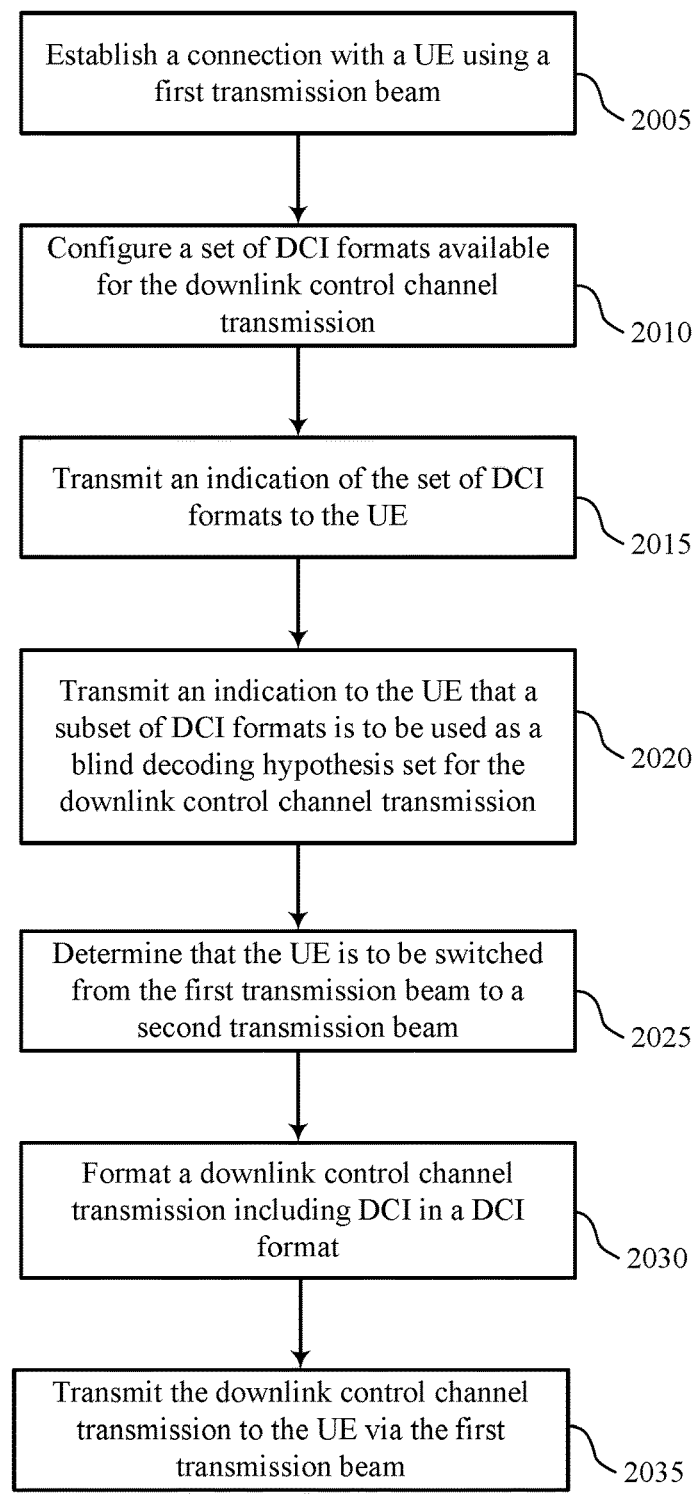

FIG. 20 shows a flowchart illustrating a method 2000 for transmission of beam switch commands through control channel signaling in accordance with aspects of the present disclosure. The operations of method 2000 may be implemented by a base station 105 or its components as described herein. For example, the operations of method 2000 may be performed by a base station communications manager 1215, 1315, 1415, and 1515 as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 2005, the base station 105 may establish a connection with a user equipment (UE) using a first transmission beam. The operations of block 2005 may be performed according to the methods described herein. In some cases, the connection may be established following a beam sweep procedure, a beam refinement procedure, or both. In some cases, the first transmission may be established with a first set of beamforming parameters that provide the first transmission beam in a first direction. In certain examples, aspects of the operations of block 2005 may be performed by a transmission beam manager as described with reference to FIGS. 12 through 15.

At block 2010, the base station 105 may configure a set of DCI formats available for the downlink control channel transmission. The operations of block 2010 may be performed according to the methods described herein. In some cases, the set of DCI formats available the downlink control channel transmission may include a DCI format in which a beam switch command is appended to one or more other DCI bit fields. In some cases, the set of DCI formats available the downlink control channel transmission may include a DCI format in which a DCI bit field of another DCI format is re-used for the beam switch command. In certain examples, aspects of the operations of block 2010 may be performed by a configuration manager as described with reference to FIGS. 12 through 15.

At block 2015, the base station 105 may transmit an indication of the set of DCI formats to the UE 115. The operations of block 2015 may be performed according to the methods described herein. In some cases, the base station may transmit the indication of the set of DCI formats to the UE 115 via RRC signaling or via a MAC-CE. In certain examples, aspects of the operations of block 2015 may be performed by a configuration manager as described with reference to FIGS. 12 through 15.

At block 2020, the base station 105 may transmit an indication to the UE 115 that a subset of DCI formats is to be used as a blind decoding hypothesis set for the downlink control channel transmission. The operations of block 2020 may be performed according to the methods described herein. In some cases, the subset of DCI formats may include one or more DCI formats that do not include beam switch commands. In some cases, the subset of DCI formats may include one or more DCI formats that may include beam switch commands and that do not include beam switch commands. In some cases, the indication may be transmitted to the UE 115 via RRC signaling or in a MAC-CE. In certain examples, aspects of the operations of block 2020 may be performed by a configuration manager as described with reference to FIGS. 12 through 15.

At block 2025, the base station 105 may determine that the UE 115 is to be switched from the first transmission beam to a second transmission beam. The operations of block 2025 may be performed according to the methods described herein. In some cases, the determination that the UE 115 is to be switched may be made based on one or more measurements of the first transmission beam. In some cases, the determination may be made based at least in part on a beam refinement signal. In certain examples, aspects of the operations of block 2025 may be performed by a beam switching component as described with reference to FIGS. 12 through 15.

At block 2030, the base station 105 may format a downlink control channel transmission including downlink control information (DCI) in a DCI format, the DCI format including one or more bit fields comprising a beam switch command to switch from the first transmission beam to the second transmission beam. The operations of block 2030 may be performed according to the methods described herein. The DCI format, in some examples, may include one or more bit fields that are appended to one or more other DCI bit fields. In some cases, the DCI format may include a bit field that is re-used to indicate a beam switch command. In certain examples, aspects of the operations of block 2030 may be performed by a DCI manager as described with reference to FIGS. 12, 13, and 15.

At block 2035, the base station 105 may transmit the downlink control channel transmission to the UE 115 via the first transmission beam. The operations of block 2035 may be performed according to the methods described herein. In some cases, subsequent to the transmission of the downlink control channel transmission, one or more other downlink transmissions are transmitted using the second transmission beam. In some cases, one or more subsequent uplink transmissions may also be based at least in part on the beam switch command. In certain examples, aspects of the operations of block 2035 may be performed by a transmitter as described with reference to FIGS. 12, 13, and 15.

Figure 21:
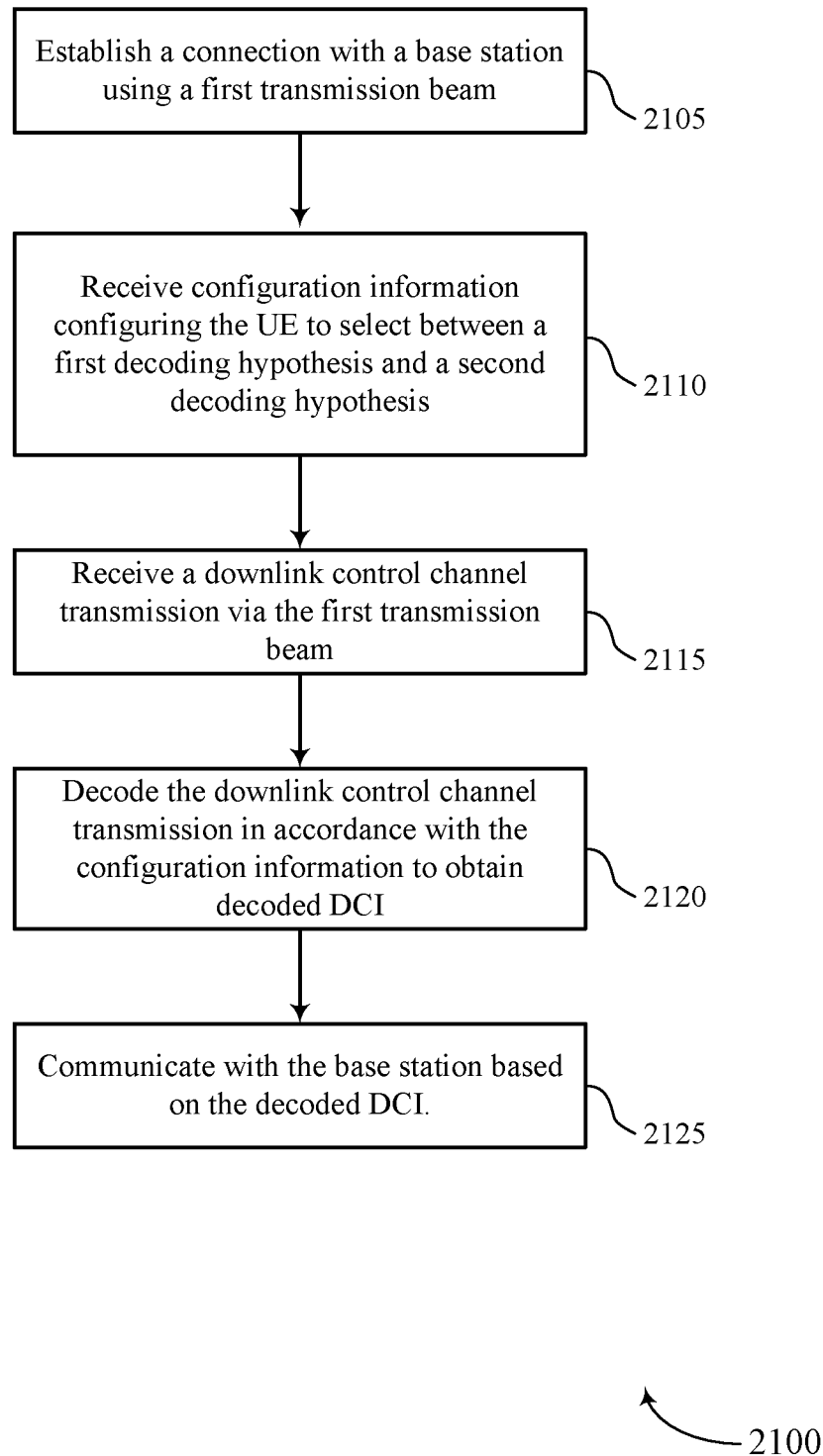

FIG. 21 shows a flowchart illustrating a method 2100 for transmission of beam switch commands through control channel signaling in accordance with aspects of the present disclosure. The operations of method 2100 may be implemented by a UE 115 or its components as described herein. For example, the operations of method 2100 may be performed by a UE communications manager 815, 915, 1015, and 1115 as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 2105, the UE 115 may establish a connection with a base station using a first transmission beam. In some cases, the connection may be established following a beam sweep procedure, a beam refinement procedure, or both. In some cases, the first transmission beam may be established with a first set of beamforming parameters that provide the first transmission beam in a first direction. The operations of 2105 may be performed according to the methods described herein. In some examples, aspects of the operations of 2105 may be performed by a transmission beam manager as described with reference to FIGS. 8 through 11.

At 2110, the UE 115 may receive configuration information configuring the UE 115 to select between a first decoding hypothesis corresponding to downlink control information (DCI) including a bit field comprising a beam switch command and a second decoding hypothesis corresponding to the DCI not including the bit field. In some cases, UE 115 may receive the configuration information via RRC signaling or a MAC-CE. The operations of 2110 may be performed according to the methods described herein. In certain examples, aspects of the operations of 2110 may be performed by a DCI manager as described with reference to FIGS. 8 through 11.

At 2115, the UE 115 may receive a downlink control channel transmission via the first transmission beam. In some cases, the downlink control channel transmission may be a PDCCH transmission that includes DCI in a DCI format corresponding to the first decoding hypothesis or the second decoding hypothesis. The operations of 2115 may be performed according to the methods described herein. In certain examples, aspects of the operations of 2115 may be performed by a blind decoding component as described with reference to FIGS. 8 through 11.

At 2120, the UE 115 may decode the downlink control channel transmission in accordance with the configuration information to obtain decoded DCI. In some cases, the UE 115 may perform blind decoding of the downlink control channel transmission in which the first and/or second blind decoding hypotheses are attempted. The operations of 2120 may be performed according to the methods described herein. In certain examples, aspects of the operations of 2120 may be performed by a blind decoding component as described with reference to FIGS. 8 through 11.

At 2125, the UE 115 may communicate with the base station 105 based at least in part on the decoded DCI. In some cases, the DCI may not include a beam switch command, and the UE 115 and the base station 105 may continue to communicate using the first beam. In some cases, the DCI may include a beam switch command, and the UE 115 and the base station 105 may communicate using a second beam that is different than the first beam. The operations of 2125 may be performed according to the methods described herein. In certain examples, aspects of the operations of 2125 may be performed by a transmission beam manager as described with reference to FIGS. 8 through 11.

Figure 22:
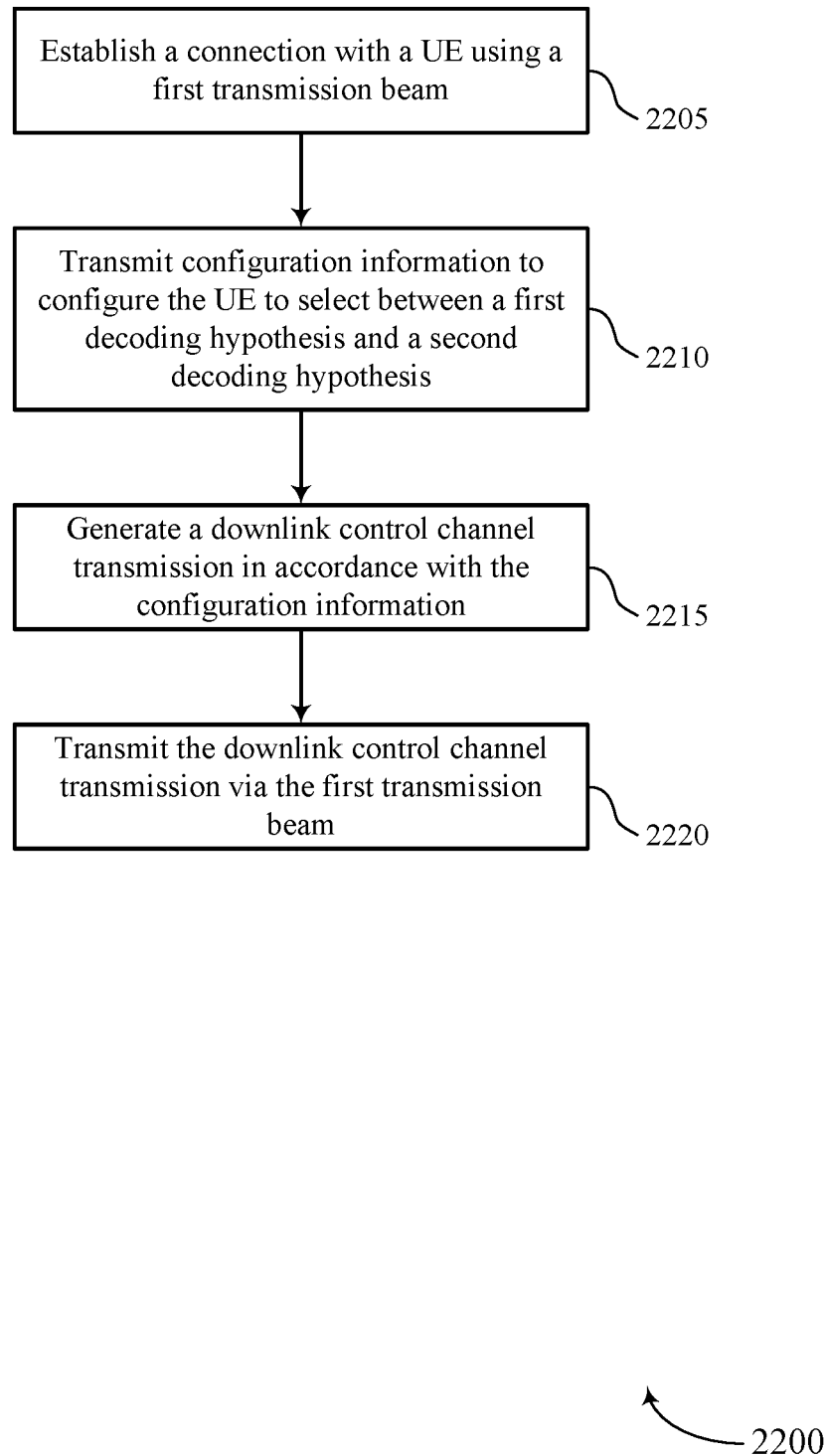

FIG. 22 shows a flowchart illustrating a method 2200 for transmission of beam switch commands through control channel signaling in accordance with aspects of the present disclosure. The operations of method 2200 may be implemented by base station 105 or its components as described herein. For example, the operations of method 2200 may be performed by base station communications manager 1215, 1315, 1415 and 1515 as described with reference to FIGS. 12 through 15. In some examples, base station 105 may execute a set of codes to control the functional elements of the device to perform the functions described below. Additionally or alternatively, the base station 105 may perform aspects of the functions described below using special-purpose hardware.

At 2205, the base station 105 may establish a connection with a UE 115 using a first transmission beam. In some cases, the connection may be established following a beam sweep procedure, a beam refinement procedure, or both. In some cases, the first transmission may be established with a first set of beamforming parameters that provide the first transmission beam in a first direction. The operations of 2205 may be performed according to the methods described herein. In certain examples, aspects of the operations of 2205 may be performed by a transmission beam manager as described with reference to FIGS. 12 through 15.

At 2210, the base station 105 may transmit configuration information to configure the UE 115 to select between a first decoding hypothesis corresponding to DCI including a bit field comprising a beam switch command and a second decoding hypothesis corresponding to the DCI not including the bit field. In some cases, the base station 105 may transmit the configuration information via RRC signaling or a MAC-CE. The operations of 2210 may be performed according to the methods described herein. In certain examples, aspects of the operations of 2210 may be performed by a DCI manager as described with reference to FIGS. 12 through 15.

At 2215, the base station 105 may generate a downlink control channel transmission in accordance with the configuration information. In some cases, the downlink control channel transmission may be a PDCCH transmission that includes DCI in a DCI format corresponding to the first decoding hypothesis or the second decoding hypothesis. The operations of 2215 may be performed according to the methods described herein. In certain examples, aspects of the operations of 2215 may be performed by a transmission beam manager as described with reference to FIGS. 12 through 15.

At 2220, the base station 105 may transmit the downlink control channel transmission via the first transmission beam. In some cases, the downlink control channel transmission may be a transmission transmitted on a first transmission beam within a PDCCH. The operations of 2220 may be performed according to the methods described herein. In certain examples, aspects of the operations of 2220 may be performed by a transmission beam manager as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. A method for wireless communication by a user equipment (UE), comprising:
   communicating with a base station using a first beam;
   receiving a first downlink control information (DCI) from a base station on the first beam, wherein the first DCI does not include a beam switch command;
   decoding the first DCI;
   receiving a second DCI from the base station on the first beam, wherein the second DCI comprises a beam switch command;
   decoding the second DCI; and
   communicating with the base station using a second beam based at least in part on the beam switch command in the second DCI.

2. The method of claim 1, wherein the second DCI comprises a beam index that allows the UE to identify the second beam.

3. The method of claim 1, further comprising receiving an activation bit in advance of receiving the second DCI where the activation bit indicates that the second DCI contains the beam switch command.

4. The method of claim 3 where the activation bit is provided in radio resource control (RRC) signaling.

5. An apparatus for wireless communication, comprising:
   a memory; and
   at least one processor coupled to the memory and configured to:
   communicate with a base station using a first beam;
   receive a first downlink control information (DCI) from a base station on the first beam;
   decode the first DCI, where the first DCI does not include a beam switch command;
   receive a second DCI from the base station on the first beam, wherein the second DCI comprises a beam switch command;
   decode the second DCI; and
   communicate with the base station using a second beam based at least in part on the beam switch command in the second DCI.

6. The apparatus of claim 5, wherein where the second DCI comprises a beam index that allows the UE to identify the second beam.

7. The apparatus of claim 5, wherein the at least one processor is further configured to receive an activation bit in advance of receiving the second DCI, wherein the activation bit indicates that the second DCI contains the beam switch command.

8. The apparatus of claim 7, wherein the activation bit is provided in radio resource control (RRC) signaling.

9. An apparatus for wireless communication, comprising:
   means for communicating with a base station using a first beam;
   means for receiving a first downlink control information (DCI) from a base station on the first beam, wherein the first DCI does not include a beam switch command;
   means for decoding a first DCI;
   means for receiving a second DCI from the base station on the first beam, wherein the second DCI comprises a beam switch command;
   means for decoding the second DCI; and
   means for communicating with the base station using a second beam based at least in part on the beam switch command in the second DCI.

10. The apparatus of claim 9, wherein the second DCI comprises a beam index that allows the UE to identify the second beam.

11. The apparatus of claim 9, further comprising means for receiving an activation bit in advance of receiving the second DCI, wherein the activation bit indicates that the second DCI contains the beam switch command.

12. The apparatus of claim 11, wherein the activation bit is provided in radio resource control (RRC) signaling.

13. A non-transitory computer-readable medium storing a set of instructions for wireless communication, the set of instructions including one or more instructions that, when executed by one or more processors of a user equipment (UE), cause the UE to:
- communicate with a base station using a first beam;
- receive a first downlink control information (DCI) from a base station on the first beam, wherein the first DCI does not include a beam switch command;
- decode the first DCI;
- receive a second DCI from the base station on the first beam, wherein the second DCI comprises a beam switch command;
- decode the second DCI; and
- communicate with the base station using a second beam based at least in part on the beam switch command in the second DCI.

14. The non-transitory computer-readable medium of claim 13, wherein where the second DCI comprises a beam index that allows the UE to identify the second beam.

15. The non-transitory computer-readable medium of claim 13, wherein the set of instructions further include one or more instructions to receive an activation bit in advance of receiving the second DCI where the activation bit indicates that the second DCI contains the beam switch command.

16. The non-transitory computer-readable medium of claim 15, wherein the activation bit is provided in radio resource control (RRC) signaling.

* * * * *